(12) United States Patent
Suzuki et al.

(10) Patent No.: US 12,723,684 B2
(45) Date of Patent: Sep. 1, 2026

(54) STEEL PIPE JOINT STRUCTURE AND METHOD FOR PROCESSING STEEL PIPE

(71) Applicant: METAL ONE CORPORATION, Tokyo (JP)

(72) Inventors: Teruaki Suzuki, Tokyo (JP); Masatsugu Nishi, Tokyo (JP); Nobuhide Sato, Tokyo (JP); Kenzo Urabe, Tokyo (JP); Tomonori Inoue, Tokyo (JP)

(73) Assignee: METAL ONE CORPORATION, Tokyo (JP)

( * ) Notice: Subject to any disclaimer, the term of this patent is extended or adjusted under 35 U.S.C. 154(b) by 112 days.

(21) Appl. No.: 18/730,409

(22) PCT Filed: Jan. 20, 2022

(86) PCT No.: PCT/JP2022/001960
§ 371 (c)(1),
(2) Date: Jul. 19, 2024

(87) PCT Pub. No.: WO2023/139721
PCT Pub. Date: Jul. 27, 2023

(65) Prior Publication Data

US 2025/0155055 A1 May 15, 2025

(51) Int. Cl.
*F16L 15/06* (2006.01)
*B23B 1/00* (2006.01)
*F16L 15/00* (2006.01)

(52) U.S. Cl.
CPC ................ *F16L 15/06* (2013.01); *B23B 1/00* (2013.01); *F16L 15/001* (2013.01)

(58) Field of Classification Search
CPC ....... F16L 15/06; F16L 15/001; F16L 15/006; E21B 17/042; B23B 1/00
See application file for complete search history.

(56) References Cited

U.S. PATENT DOCUMENTS 4,384,737 A 5/1983 Reusser
4,616,537 A * 10/1986 Axford ................ F16L 15/001 82/110

(Continued)

FOREIGN PATENT DOCUMENTS

JP S6069387 A 4/1985
JP H0280886 A 3/1990

(Continued)

OTHER PUBLICATIONS

International Search Report (PCT/ISA/210) with English translation and Written Opinion (PCT/ISA/237) mailed on Apr. 5, 2022, by the Japanese Patent Office as the International Searching Authority for International Application No. PCT/JP2022/001960, 13 pages.

(Continued)

*Primary Examiner* — David Bochna
(74) *Attorney, Agent, or Firm* — BUCHANAN, INGERSOLL & ROONEY PC

(57) ABSTRACT

A steel pipe joint structure connects a first steel pipe and a second steel pipe with each other, the first steel pipe having an external thread, the second steel pipe having an internal thread, wherein the first steel pipe has the external thread, and the second steel pipe has the internal thread. The external thread part includes a pin front parallel thread part, and a pin complete thread part, and the internal thread part includes a box rear incomplete thread part, and a box complete thread part. The box rear incomplete thread part and the pin front parallel thread part are threadedly engaged with each other and, in cross section including a pipe axis, a root of the pin front parallel thread part has a larger width than a root of the pin complete thread part.

18 Claims, 17 Drawing Sheets

(56) References Cited

U.S. PATENT DOCUMENTS

| | | | | |
|---|---|---|---|---|
| 4,629,223 | A | 12/1986 | Dearden et al. | |
| 6,412,831 | B1 | 7/2002 | Noel et al. | |
| 2015/0316181 | A1* | 11/2015 | Tejeda | F16L 15/06 285/66 |
| 2016/0186899 | A1 | 6/2016 | Besse | |
| 2016/0305585 | A1 | 10/2016 | Inose et al. | |
| 2021/0025523 | A1* | 1/2021 | Kawai | F16L 15/001 |
| 2021/0033136 | A1* | 2/2021 | Garcha | F16L 5/06 |
| 2021/0254413 | A1* | 8/2021 | Campbell | F16L 15/06 |
| 2022/0065371 | A1 | 3/2022 | Sugino et al. | |
| 2022/0252188 | A1 | 8/2022 | Oku et al. | |
| 2023/0408000 | A1* | 12/2023 | Owoeye | F16L 15/06 |

FOREIGN PATENT DOCUMENTS

| | | | |
|---|---|---|---|
| JP | H05500842 | A | 2/1993 |
| JP | 4939688 | B2 | 5/2012 |
| JP | 2018500526 | A | 1/2018 |
| WO | 9102185 | A1 | 2/1991 |
| WO | 2015033997 | A1 | 3/2015 |
| WO | 2015105054 | A1 | 7/2015 |
| WO | 2021044862 | A1 | 3/2021 |

OTHER PUBLICATIONS

Office Action (Notice of Reasons for Refusal) issued on Sep. 9, 2025, in corresponding Japanese Patent Application No. 2023-574972 and machine English translation of the Office Action. (8 pages).

* cited by examiner

C

STEEL PIPE JOINT STRUCTURE AND METHOD FOR PROCESSING STEEL PIPE

TECHNICAL FIELD

The present disclosure relates to a steel pipe joint structure, and particularly to the structure and a processing method for thread parts formed on steel pipes.

BACKGROUND ART

As a technique of connecting oil country tubular goods used for the search for and production of oil fields or the like, a steel pipe joint structure has been widely used, which connects steel pipes by using internal and external tapered threads. In the steel pipe joint structure, an external thread part and an internal thread part are fitted and brought into close contact with each other. Hereinafter, a configuration in which a pair of steel pipes are connected with each other via a joint by causing an internal thread and an external thread to be threadedly engaged with each other is referred to as "steel pipe joint structure".

There are two types of steel pipe joint structure, that is, integral type and coupling type. In the steel pipe joint structure of an integral type, an external thread is provided at one end portion of an oil country tubular good to form a pin, an internal thread is provided at the other end portion of the oil country tubular good to form a box, and the internal thread of the box and the external thread of the pin are threadedly engaged with each other. In the steel pipe joint structure of a coupling type, an external thread is provided at each end portion of an oil country tubular good to form a pin, an internal thread is provided at each end portion of another pipe to form a box, the internal thread of the box on one end side and the external thread of the pin part of the oil country tubular good on one end side are threadedly engaged with each other, and the internal thread of the same box on the other end side and the external thread of the pin of another oil country tubular good are threadedly engaged with each other. In the case of the integral type, for example, a portion in which a thread is provided in a pin or a box is referred to as "thread part". Each of a non-threaded part ranging from a most distal end portion of a pin to the first screw thread of a thread part and a non-threaded part ranging from a deepest end portion (a portion with which the most distal end portion of the pin is brought into contact) of a box to the first screw valley of a thread part is referred to as "inner surface shoulder part". Each of the deepest end portion of the pin and the most distal end portion of the box is referred to as "outer surface shoulder part". When the thread joint is fastened, the inner surface shoulder parts of the pin and the box are locally brought into metal-metal contact with each other, and the outer surface shoulder parts of the pin and the box are locally brought into metal-metal contact with each other, so that the contact portions play a role as a seal.

In a steel pipe joint structure or other structures having no seal surface (threadless surface), an external thread part and an internal thread part are fitted and brought into close contact with each other, thus ensuring sealability and pressure resistance of the steel pipe joint structure. Alternatively, an internal thread and an external thread are threadedly engaged with each other, and sealing portions are brought into contact with each other for a metal seal, so that sealability and pressure resistance of the steel pipe joint structure are ensured (see Patent Literature 1, for example).

CITATION LIST

Patent Literature

Patent Literature 1: International Publication No. WO 2015/033997

SUMMARY OF INVENTION

Technical Problem

In the steel pipe joint structure for oil country tubular goods disclosed in Patent Literature 1, the abutment surface of the pin and the abutment surface of the box come into close contact with each other with screwing of the pin. The abutment surface plays a role as a stopper that restricts screwing of the pin, and also plays a role of applying, to the external thread part, a load in the direction opposite to the screwing advancing direction, that is, a so-called fastening axial force on a thread. This fastening axial force causes the thread parts or the metal sealing portions of the steel pipe joint structure to come into close contact with each other, thus ensuring sealability and pressure resistance of the steel pipe joint structure. The root of the thread part is a portion where the pin and the box have the smallest cross-sectional area. The end portions of the engagement region of the thread parts, that is, the end portion of the thread part of the pin on the side having a larger diameter and the end portion of the thread part of the box on the side having a smaller diameter, bear a tensile load applied after fastening. The root of the thread part of the pin at the end portion of the engagement region has a cross section having the smallest cross-sectional area, and this cross section is referred to as "critical section of the thread part of the pin". The root of the thread part of the box at the end portion of the engagement region has a cross section having the smallest cross-sectional area, and this cross section is referred to as "critical section of the thread part of the box". When the cross-sectional area of the root of the thread part of the pin at the end portion on the side having a larger diameter and the cross-sectional area of the root of the thread part of the box at the end portion on the side having a smaller diameter are compared with each other, the smaller cross-sectional area is considered to be the critical section area of the joint.

In the steel pipe joint structure for oil country tubular goods according to Patent Literature 1, in the end portions of the engagement region of the thread parts of the pin and the box, the end portion of the engagement region of the thread part of the pin on the side having a larger diameter or the end portion of the engagement region of the thread part of the box on the side having a smaller diameter has the critical section area of the joint. To increase the withstand load against tension, it is necessary to increase each critical section area. To increase the critical section area of the pin, it is necessary to increase the wall thickness of the steel pipe. To increase the critical section area of the box, it is necessary to increase the outer diameter of the steel pipe. In this case, the area in which an inner surface shoulder part 96 and an outer surface shoulder part 95 are brought into contact with each other is decreased, so that rigidity is reduced and hence, a high fastening torque cannot be withstood. Thus, the steel pipe joint structure has a problem that a sufficient fastening torque cannot be ensured.

An object of the present disclosure is to provide a steel pipe joint structure that can obtain a high fastening torque without increasing an outer diameter and a wall thickness, and to provide a method for processing a steel pipe.

Solution to Problem

A steel pipe joint structure according to an embodiment of the present disclosure is a steel pipe joint structure that connects a first steel pipe and a second steel pipe with each other, the first steel pipe having an external thread at least at one end portion of the first steel pipe, the second steel pipe having an internal thread at least at one end portion of the second steel pipe, wherein in the first steel pipe, a pin front part, an external thread part having the external thread, and a pin rear part are arranged in this order from a distal end of the first steel pipe, in the second steel pipe, a box front part, an internal thread part having the internal thread, and a box rear part are arranged in this order from a distal end of the second steel pipe, the external thread part includes a pin front parallel thread part at an end portion on a pin front part side, the pin front parallel thread part being a parallel thread and an incomplete thread, and a pin complete thread part at a center portion of the external thread part, the pin complete thread part being a tapered thread and a complete thread, the internal thread part includes a box rear incomplete thread part at an end portion on a box rear part side, the box rear incomplete thread part being a tapered thread and an incomplete thread, and a box complete thread part at a center portion of the internal thread part, the box complete thread part being a tapered thread and a complete thread, the box rear incomplete thread part and the pin front parallel thread part are threadedly engaged with each other, and in cross section including a pipe axis, a root of the pin front parallel thread part has a larger width than a root of the pin complete thread part.

A steel pipe joint structure according to another embodiment of the present disclosure is a steel pipe joint structure that connects a first steel pipe and a second steel pipe with each other, the first steel pipe having an external thread at least at one end portion of the first steel pipe, the second steel pipe having an internal thread at least at one end portion of the second steel pipe, wherein in the first steel pipe, a pin front part, an external thread part having the external thread, and a pin rear part are arranged in this order from a distal end of the first steel pipe, in the second steel pipe, a box front part, an internal thread part having the internal thread, and a box rear part are arranged in this order from a distal end of the second steel pipe, the external thread part includes a pin rear incomplete thread part at an end portion on a pin rear part side, the pin rear incomplete thread part being a tapered thread and an incomplete thread, and a pin complete thread part at a center portion of the external thread part, the pin complete thread part being a tapered thread and a complete thread, the internal thread part includes a box front parallel thread part at an end portion on a box front part side, the box front parallel thread part being a parallel thread and an incomplete thread, and a box complete thread part at a center portion of the internal thread part, the box complete thread part being a tapered thread and a complete thread, the pin rear incomplete thread part and the box front parallel thread part are threadedly engaged with each other, and in cross section including a pipe axis, a root of the box front parallel thread part has a larger width than a root of the box complete thread part.

A method for processing a steel pipe according to still another embodiment of the present disclosure is a method for processing a steel pipe, an external thread part or an internal thread part being processed at an end portion of the steel pipe by the method, wherein the external thread part or the internal thread part includes a parallel thread part and a tapered thread part in this order from a distal end of the steel pipe, the method uses a plurality of normal processing passes in which a thread cutting insert is fed from an initial position at a first feeding speed, thus continuously processing the parallel thread part and the tapered thread part, a first size reduction processing pass in which a stabbing flank of the parallel thread part is processed at a second feeding speed, a second size reduction processing pass in which the stabbing flank of the parallel thread part is processed at the second feeding speed, and a stabbing flank of the tapered thread part is processed at the first feeding speed, and a third size reduction processing pass in which a load flank of the parallel thread part is processed at a third feeding speed, and processing is performed on the tapered thread part at the first feeding speed, in the first size reduction processing pass and the second size reduction processing pass, processing is started from a position closer to the steel pipe than the initial position, and in the third size reduction processing pass, the processing is started from a position farther from the steel pipe than the initial position.

Further, a method for processing a steel pipe according to still another embodiment of the present disclosure is a method for processing a steel pipe, an external thread part or an internal thread part being processed at an end portion of the steel pipe by the method, wherein the external thread part or the internal thread part includes a parallel thread part and a tapered thread part in this order from a distal end of the steel pipe, the method uses a plurality of normal processing passes in which a thread cutting insert is fed from an initial position at a first feeding speed, thus continuously processing the parallel thread part and the tapered thread part, a first size reduction processing pass in which a stabbing flank of the parallel thread part and a stabbing flank of a portion of the tapered thread part are processed at a second feeding speed, a second size reduction processing pass in which the stabbing flank of the parallel thread part and the stabbing flank of the portion of the tapered thread part are processed at the second feeding speed, and a stabbing flank of portions of the tapered thread part other than the portion is processed at the first feeding speed, and a third size reduction processing pass in which a load flank of the parallel thread part and a load flank of the portion of the tapered thread part are processed at a third feeding speed, and processing is performed on the portions of the tapered thread part other than the portion at the first feeding speed, in the first size reduction processing pass and the second size reduction processing pass, processing is started from a position closer to the steel pipe than the initial position, and in the third size reduction processing pass, the processing is started from a position farther from the steel pipe than the initial position.

Advantageous Effects of Invention

According to the embodiment of the present disclosure, the incomplete screw thread at the distal end portion of the pin or the box of the steel pipe joint (the pin front parallel thread part or the box front parallel thread part) is formed to have a small width, thus being threadedly engaged with the screw thread of the incomplete thread part at the rear part of the counterpart without causing interference. Consequently, the steel pipe joint structure can increase the critical section area of the thread part of the first steel pipe, being the pin, and can also ensure the cross-sectional area of the second steel pipe at a position in the vicinity of the box front shoulder surface without increasing the outer diameter of the second steel pipe, being the box. Further, the screw thread of the box-side parallel thread part, being the counterpart of the pin rear incomplete thread part, has a small width, thus allowing the pin rear incomplete thread part to be formed to prevent interference between the screw threads and hence, the pin rear incomplete thread part can be threadedly engaged with the box-side parallel thread part without decreasing the diameter of the root. Therefore, the steel pipe joint structure can ensure a cross-sectional area at a position in the vicinity of a pin rear shoulder surface provided to the first steel pipe, without increasing the wall thickness of the first steel pipe. That is, it is not necessary to reduce the critical section area of the pin. Accordingly, the steel pipe joint structure can enhance strength and rigidity against a fastening axial force, thus increasing a fastening torque, leading to enhancement of sealability and pressure resistance.

DESCRIPTION OF EMBODIMENTS

Embodiment 1

Figure 1:
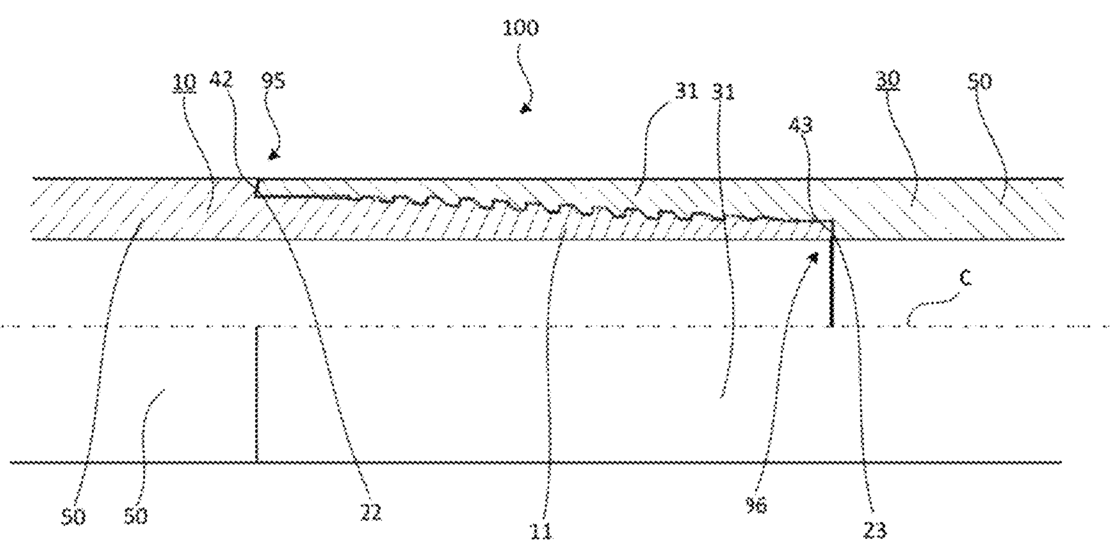
FIG. 1 is a diagram illustrating a steel pipe joint structure 100 according to Embodiment 1.

FIG. 1 is a diagram illustrating a steel pipe joint structure 100 according to Embodiment 1. The upper half of FIG. 1 is a cross-sectional view of the steel pipe joint structure 100 taken along the center axis, and the lower half of FIG. 1 is a side view of the steel pipe joint structure 100. Respective parts in FIG. 1 are schematically shown, and the present disclosure is not limited to the mode shown in the drawing.

As shown in FIG. 1, the steel pipe joint structure 100 is configured such that a first steel pipe 10 and a second steel pipe 30 are connected with each other by causing screws formed on a pin 11 and a box 31 to be threadedly engaged with each other. The first steel pipe 10 is a steel pipe having the pin 11 at least at one end portion thereof. The second steel pipe 30 is a steel pipe having the box 31 at least at one end portion thereof. In Embodiment 1, each of the first steel pipe 10 and the second steel pipe 30 is a steel pipe having the pin 11 at one end portion thereof, and having the box 31 at the other end portion thereof, and the first steel pipe 10 and the second steel pipe 30 are integrally connected with each other. That is, as shown in FIG. 1, the pin 11 in Embodiment 1 is one end portion of one of two steel pipes having the same structure, and the box 31 in Embodiment 1 is the other end portion of the other of the two steel pipes. A pipe-like part that couples the pin 11 and the box 31, located at both end portions of one steel pipe, is referred to as "pipe part 50". However, the steel pipe joint structure 100 is not limited to a structure that integrally connects steel pipes with each other, and is also applicable to a structure that connects steel pipes with each other by coupling. In the case of the steel pipe joint structure of a coupling type, a first steel pipe 10 has the pin 11 at each end portion thereof, and a second steel pipe 30 has the box 31 at each end portion thereof.

The pin 11 of the first steel pipe 10 is formed to have a wall thickness that increases toward the pipe part 50 from a pin front shoulder surface 23 being one end surface thereof. The pin 11 includes, at least at a portion, an external thread part 13 (see FIG. 2) having a tapered surface with an outer diameter increasing while going toward the pipe part 50 from the pin front shoulder surface 23. The external thread part 13 has an external thread on the outer peripheral surface thereof.

The box 31 of the second steel pipe 30 is formed to have a wall thickness that increases toward the pipe part 50 from a box front shoulder surface 42 being one end surface thereof. The box 31 includes, at least at a portion, an internal thread part 33 (see FIG. 5) having a tapered surface with an inner diameter decreasing toward the pipe part 50 from the box front shoulder surface 42. The internal thread part 33 has an internal thread on the inner peripheral surface thereof.

The pin 11 of the first steel pipe 10 and the box 31 of the second steel pipe 30 have tapered threads, and are threadedly engaged with each other. The box front shoulder surface 42, being the distal end surface of the second steel pipe 30, is brought into contact with a pin rear shoulder surface 22. The pin rear shoulder surface 22 and the box front shoulder surface 42 are surfaces that are located on the outer peripheral side of the pin 11, formed on the first steel pipe 10, at a position close to the pipe part 50, and that intersect with a pipe axis C of the steel pipe, that is, the center axis of the steel pipe joint structure 100, at a right angle or an angle close to the right angle. In Embodiment 1, the pin rear shoulder surface 22 is a surface with the outer diameter side inclining toward the second steel pipe 30 more than the inner diameter side. The box front shoulder surface 42 is also a surface with the outer diameter side inclining toward the pipe part 50 of the second steel pipe 30 more than the inner diameter side, corresponding to the pin rear shoulder surface 22. Because the box front shoulder surface 42 and the pin rear shoulder surface 22 are inclined, when an axial load is applied to the box front shoulder surface 42, a box front part 32 is displaced inward, thus enhancing buckling performance. Further, the pin front shoulder surface 23 and a box rear shoulder surface 43 are also brought into contact with each other, thus serving as a metal seal.

The pin front shoulder surface 23, being the distal end surface of the first steel pipe 10, is brought into contact with the box rear shoulder surface 43. The pin front shoulder surface 23 is the distal end surface of the first steel pipe 10, and is a surface that intersects with the pipe axis C of the steel pipe, that is, the center axis of the steel pipe joint structure 100, at a right angle or an angle close to the right angle. In Embodiment 1, the pin front shoulder surface 23 and the box rear shoulder surface 43 are perpendicular to the pipe axis C. Each of the pin front shoulder surface 23 and the box rear shoulder surface 43 may be a surface with the outer diameter side inclining toward the second steel pipe 30 more than the inner diameter side.

(First Steel Pipe 10)

Figure 2:
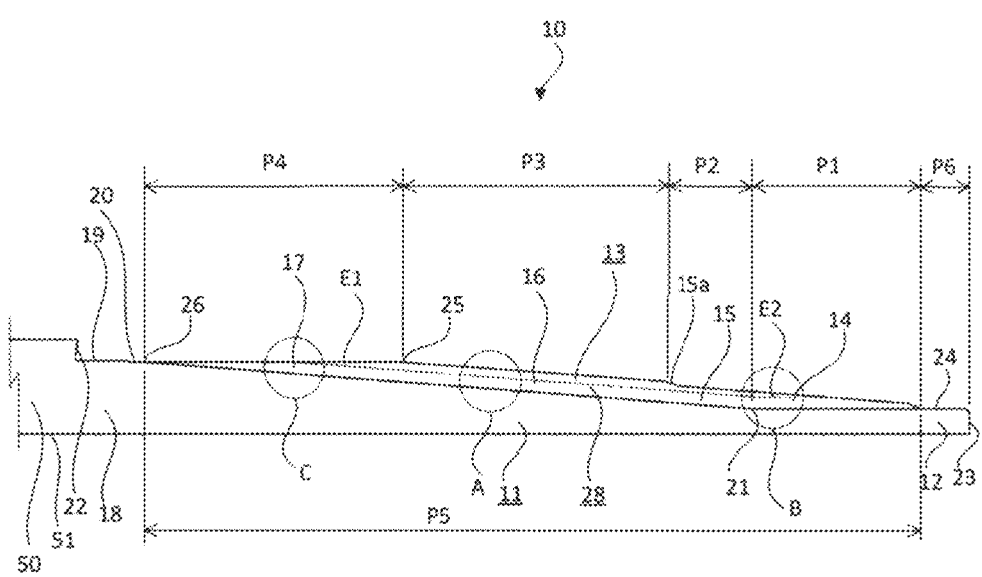
FIG. 2 is an enlarged view, in isolation, of a pin 11 of a first steel pipe 10 according to Embodiment 1.

FIG. 2 is an enlarged view, in isolation, of the pin 11 of the first steel pipe 10 according to Embodiment 1. In the pin 11 of the first steel pipe 10, a pin front part 12, the external thread part 13, and a pin rear part 18 are located in this order of arrangement from the distal end of the pin 11 along the direction of the pipe axis C.

The pin front part 12 is located at the most distal end of the pin 11, has the pin front shoulder surface 23, being the distal end surface of the first steel pipe 10, and includes a non-external-thread part 24 that has an outer periphery forming a cylindrical surface with no external thread. The pin front part 12 is a portion shown in a section P6 in FIG. 2. The non-external-thread part 24 need not be provided. In this case, the pin front part 12 has an external thread.

The external thread part 13 includes, in order from the distal end side, a pin front parallel thread part 14 (pin-side run-in part), a pin front incomplete tapered thread part 15, a pin complete thread part 16, and a pin rear incomplete thread part 17 (pin-side run-out part). The pin front parallel thread part 14 is a portion that is located at the end portion close to the pin front part 12, and that is shown in a section P1 in FIG. 2. Further, the outer periphery of the pin front parallel thread part 14 forms a tapered surface having a diameter that increases toward the pipe part 50 from the distal end surface of the pin front parallel thread part 14, and the pin front parallel thread part 14 is formed such that the effective diameter of the external thread takes a predetermined value. The diameter of the root of the external thread of the pin front parallel thread part 14 is set to a value equal to or more than the outer diameter dimension of the non-external-thread part 24 of the pin front part 12. The outer periphery of the pin front parallel thread part 14 forms a tapered surface and hence, the external thread of the pin front parallel thread part 14 is an incomplete thread.

The pin front incomplete tapered thread part 15 is a portion shown in a section P2 in FIG. 2. The portion shown in the section P2 continues on from the pin front parallel thread part 14, and has the outer periphery forming a tapered surface. The external thread formed at the portion shown in the section P2 is a tapered thread having an effective diameter that increases toward the pipe part 50 from the distal end side. However, the outer periphery of the pin front incomplete tapered thread part 15 (the crest of the screw thread) in the section P2 is smaller than the outer periphery of the pin complete thread part 16 (the crest of the screw thread) shown in a section P3, and the external thread formed in the section P2 is an incomplete thread. A stepped part **15*a* is formed between the outer periphery of the pin front incomplete tapered thread part 15 (the crest of the screw thread) in the section P2 and the outer periphery of the pin complete thread part 16 (the crest of the screw thread) shown in the section P3, thus forming a discontinuous surface. The outer periphery of the pin front incomplete tapered thread part 15 (the crest of the screw thread) in the section P2 is smaller than the outer periphery of the pin complete thread part 16 (the crest of the screw thread) shown in the section P3. The boundary between the end portion of the pin front incomplete tapered thread part 15 on the distal end side, that is, the section P2 shown in FIG. 5, and the section P1 is a connection part 21 at which a parallel thread changes to a tapered thread. In the pin front incomplete tapered thread part 15, the diameter of the root of the external thread also increases as the root extends toward the pipe part 50 from the distal end side and hence, the wall thickness of the steel pipe also gradually increases as the steel pipe extends toward the pipe part 50. The end portion of the pin front incomplete tapered thread part 15 on the pipe part 50 side has the stepped part 15*a*, and is connected to the pin complete thread part 16. The pin front parallel thread part 14 and the pin front incomplete tapered thread part 15, which are incomplete thread parts, may be collectively referred to as “pin front incomplete thread part”. In the external thread part 13, the section P2 may be omitted. That is, the external thread part 13 may adopt a mode in which the pin front parallel thread part 14 and the pin complete thread part 16** are directly connected with each other.

The pin complete thread part 16 is a portion shown in the section P3 in FIG. 2. In the pin complete thread part 16, the crest of the screw thread forms a tapered surface, thus allowing the external thread to be a complete thread. The tapered surface is parallel to an effective diameter E1 of the external thread, and the external thread is a complete thread. The tapered surface of the outer periphery of the pin complete thread part 16 (the crest of the screw thread) changes to a cylindrical surface at a point 25 that has substantially the same outer diameter dimension as a large diameter part 19 being a shoulder outer peripheral surface. In Embodiment 1, the point 25 may have an outer diameter dimension slightly smaller than that of the large diameter part 19 being the shoulder outer peripheral surface, or may have the same outer diameter dimension as the large diameter part 19. As described above, in the external thread part 13, the pin complete thread part 16 is formed in the section P3 extending to the point 25.

The pin rear incomplete thread part 17 is an end portion close to the pin rear part 18, and is a portion shown in a section P4 in FIG. 2. In the section P4, a cylindrical surface having a constant outer diameter dimension is formed and hence, the tapered thread formed in the section P4 is an incomplete thread that gradually decreases in height. The pin rear incomplete thread part 17 is formed to extend to a point 26, at which the diameter of the root of the external thread matches the outer diameter dimension of the outer peripheral surface.

The pin rear part 18 may include a small diameter part 20, having a small outer diameter, at a portion close to the distal end thereof, and may include the large diameter part 19, having a large outer diameter, at a portion close to the pipe part 50. The small diameter part 20 is a portion that has the same outer diameter dimension as the pin rear incomplete thread part 17, and that forms the chamfered part of the tapered thread. A stepped part need not be formed between the small diameter part 20 and the large diameter part 19. That is, the small diameter part 20 may be directly connected to the pin rear shoulder surface 22.

The sections P1 to P4 shown in FIG. 2 are collectively referred to as "external thread part 13". That is, a section P5 corresponds to the external thread part 13. Further, the sections P2 to P4 are referred to as "tapered thread part 28". The external thread part 13 is formed by combining the pin front parallel thread part 14 and the tapered thread part 28. With such a configuration, the pin 11 can ensure a large angle formed by the tapered thread part 28 and the pipe axis C, and can also ensure a sufficient length of the external thread part 13, a sufficient wall thickness of the pin front part 12, and a sufficient wall thickness of a portion at which the pin rear incomplete thread part 17 is provided. That is, the pin 11 can ensure a sufficient wall thickness at the distal end thereof and a sufficient wall thickness at the rear part thereof, thus enhancing strength and rigidity against fastening torque, leading to an increase in fastening torque of the steel pipe joint structure 100 when the pin front shoulder surface 23 and the box rear shoulder surface 43 are brought into contact with each other. Therefore, the steel pipe joint structure 100 can enhance sealability and pressure resistance.

Figure 3:
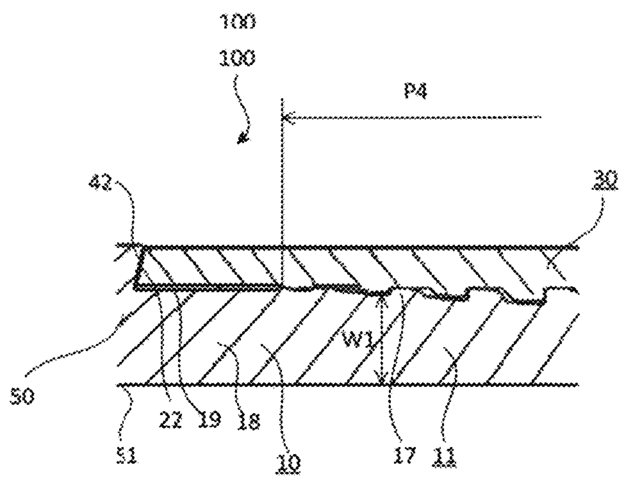
FIG. 3 is an enlarged view of a shoulder part of the steel pipe joint structure 100 according to Embodiment 1.
Figure 4:
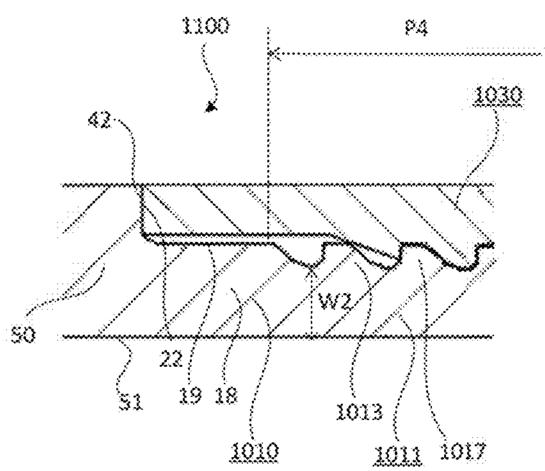
FIG. 4 is an enlarged view of a shoulder part of a steel pipe joint structure 1100 according to a comparative example.

FIG. 3 is an enlarged view of the shoulder part of the steel pipe joint structure 100 according to Embodiment 1. FIG. 4 is an enlarged view of the shoulder part of a steel pipe joint structure 1100 according to a comparative example. In the steel pipe joint structure 1100 according to the comparative example shown in FIG. 4, a complete thread part 1017 is formed to extend to a point near a pin rear shoulder surface 22 and hence, a critical section has a small wall thickness. That is, at the end portion of the engagement of an external thread part 1013 of a pin 1011, a first steel pipe 1010 has a small wall thickness, that is, the thickness from the root to the inner peripheral surface of the external thread is small. Accordingly, the steel pipe joint structure 1100 according to the comparative example has a low strength against a tensile load after fastening.

In contrast, the pin rear incomplete thread part 17 is formed at the end portion of the external thread part 13 on the pipe part 50 side and hence, at the end portion of the engagement of the external thread part 13, it is possible to increase the wall thickness of the first steel pipe 10, that is, it is possible to increase the thickness from the root to an inner peripheral surface 51 of the external thread (it is possible to set W1 shown in FIG. 3 to be larger than W2 shown in FIG. 4). Therefore, the steel pipe joint structure 100 can increase a critical section area, thus increasing strength against a tensile load after fastening. Further, the steel pipe joint structure 100 can ensure a sufficient abutting surface between the inner surface shoulder part 96 and the outer surface shoulder part 95, thus increasing a fastening torque. Thus, the steel pipe joint structure 100 can enhance sealability and pressure resistance.

(Second Steel Pipe 30)

Figure 5:
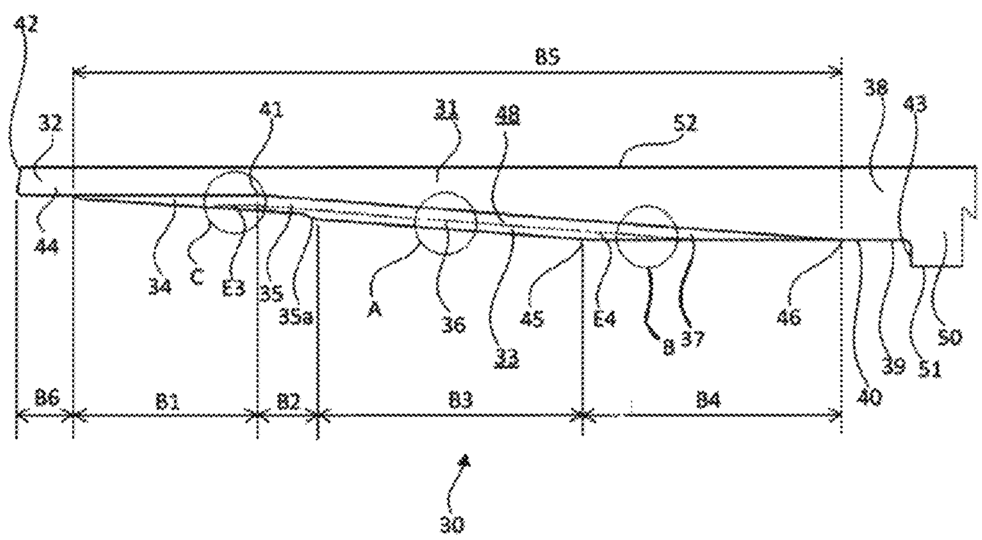
FIG. 5 is an enlarged view, in isolation, of a box 31 of a second steel pipe 30 according to Embodiment 1.

FIG. 5 is an enlarged view, in isolation, of the box 31 of the second steel pipe 30 according to Embodiment 1. In the box 31 of the second steel pipe 30, the box front part 32, the internal thread part 33, and a box rear part 38 are located in this order of arrangement from the distal end of the box 31 along the direction of the pipe axis C.

The box front part 32 is located at the most distal end of the box 31, has the box front shoulder surface 42, being the distal end surface of the second steel pipe 30, and includes a non-internal-thread part 44 that has an inner periphery forming a cylindrical surface with no internal thread. The box front part 32 is a portion shown in a section B6 in FIG. 5. The non-internal-thread part 44 need not be provided. In this case, the box front part 32 has an internal thread.

The internal thread part 33 includes, in order from the distal end side, a box front parallel thread part 34 (box-side run-in part), a box front incomplete tapered thread part 35, a box complete thread part 36, and a box rear incomplete thread part 37 (box-side run-out part). The box front parallel thread part 34 is an end portion close to the box rear part 38, and is a portion shown in a section B1 in FIG. 5. Further, the inner periphery of the box front parallel thread part 34 forms a tapered surface having a diameter that decreases toward the pipe part 50 from the distal end surface of the box front parallel thread part 34, and the box front parallel thread part 34 is formed such that the effective diameter of the internal thread takes a predetermined value. The diameter of the root of the internal thread of the box front parallel thread part 34 is set to a value equal to or less than the inner diameter dimension of the non-internal-thread part 44 of the box front part 32. The inner periphery of the box front parallel thread part 34 (a surface formed by the crest part of the screw thread) forms a tapered surface and hence, the internal thread of the box front parallel thread part 34 is an incomplete thread.

The box front incomplete tapered thread part 35 is a portion shown in a section B2 in FIG. 5. The portion shown in the section B2 continues on from the box front parallel thread part 34, and has the inner periphery forming a tapered surface. The internal thread formed at the portion shown in the section B2 is a tapered thread having an effective diameter that decreases toward the pipe part 50 from the distal end side. However, the inner periphery of the box front incomplete tapered thread part 35 (the crest of the screw thread) in the section B2 is larger than the inner periphery of the box complete thread part 36 (the crest of the screw thread) shown in a section B3, and the internal thread formed in the section B2 is an incomplete thread. A stepped part 35*a* is formed between the inner periphery of the box front incomplete tapered thread part 35 (the crest of the screw thread) in the section B2 and the inner periphery of the box complete thread part 36 (the crest of the screw thread) shown in the section B3, thus forming a discontinuous surface. The inner periphery of the box front incomplete tapered thread part 35 (the crest of the screw thread) in the section B2 is larger than the inner periphery of the box complete thread part 36 (the crest of the screw thread) shown in the section B3. The boundary between the end portion of the box front incomplete tapered thread part 35 on the distal end side, that is, the section B2 shown in FIG. 5, and the section B1 is a connection part 41 at which a parallel thread changes to a tapered thread. In the box front incomplete tapered thread part 35, the diameter of the root of the internal thread also decreases as the root extends toward the pipe part 50 from the distal end side and hence, the wall thickness of the steel pipe also gradually increases as the steel pipe extends toward the pipe part 50. The end portion of the box front incomplete tapered thread part 35 on the pipe part 50 side has a stepped part, and is connected to the box complete thread part 36. The box front parallel thread part 34 and the box front incomplete tapered thread part 35, which are incomplete thread parts, are referred to as "shoulder-side second incomplete thread part".

The box complete thread part 36 is a portion shown in the section B3 in FIG. 5. In the box complete thread part 36, the crest of the screw thread forms a tapered surface, thus allowing the internal thread to be a complete thread. The tapered surface is parallel to the effective diameter of the internal thread, and the internal thread is a complete thread. The tapered surface of the inner periphery of the box complete thread part 36 (the crest of the screw thread) changes to a cylindrical surface at a point 45 that has the same inner diameter dimension as a small diameter part 39 being the inner peripheral surface of the box rear part 38. In Embodiment 1, the point 45 has the same inner diameter dimension as the small diameter part 39 being the inner peripheral surface of the box rear part 38. As described above, in the internal thread part 33, the box complete thread part 36 is formed in the section B3 extending to the point 45.

The box rear incomplete thread part 37 is an end portion close to the box rear part 38, and is a portion shown in a section B4 in FIG. 5. In the section B4, a cylindrical surface having a constant inner diameter dimension is formed and hence, the tapered thread formed in the section B4 is an incomplete thread that gradually decreases in height. The box rear incomplete thread part 37 is formed to extend to a point 46 at which the diameter of the root of the internal thread matches the inner diameter dimension of the inner peripheral surface of the box rear part 38.

The box rear part 38 may include a large diameter part 40, having a large inner diameter, at a portion close to the distal end thereof, and may include the small diameter part 39, having a small inner diameter, at a portion close to the pipe part 50. The large diameter part 40 is a portion that is formed to have the same inner diameter dimension as the box rear incomplete thread part 37, and that forms the chamfered part of the tapered thread.

The sections B1 to B4 shown in FIG. 5 are collectively referred to as "internal thread part 33". The sections B2 to B4 are referred to as "tapered thread part 48". The internal thread part 33 is formed by combining the box front parallel thread part 34 and the tapered thread part 48. With such a configuration, the box 31 can ensure a large angle formed by the tapered thread part 48 and the pipe axis C, and can also ensure the length of the internal thread part 33, and the wall thicknesses of the box front part 32 and the box rear part 38. That is, the box 31 can ensure a sufficient wall thickness at the distal end thereof and a sufficient wall thickness of the box rear part 38 simultaneously, thus enhancing strength and rigidity against fastening torque, leading to an increase in fastening torque of the steel pipe joint structure 100 when the pin rear shoulder surface 22 and the box front shoulder surface 42 are brought into contact with each other and when the pin front shoulder surface 23 and the box rear shoulder surface 43 are brought into contact with each other. Therefore, the steel pipe joint structure 100 can enhance sealability and pressure resistance.

In the internal thread part 33, the box rear incomplete thread part 37 is formed at the end portion of the internal thread part 33 on the pipe part 50 side and hence, at the end portion of the engagement of the internal thread part 33, it is possible to increase the wall thickness of the second steel pipe 30, that is, it is possible to increase the thickness from the root to the outer peripheral surface 52 of the internal thread. Therefore, the steel pipe joint structure 100 can increase a critical section area, thus increasing strength against a tensile load after fastening. Further, the steel pipe joint structure 100 can ensure a sufficient abutting surface between the inner surface shoulder part 96 and the outer surface shoulder part 95, thus increasing a fastening torque. Thus, the steel pipe joint structure 100 can enhance sealability and pressure resistance.

Figure 6:
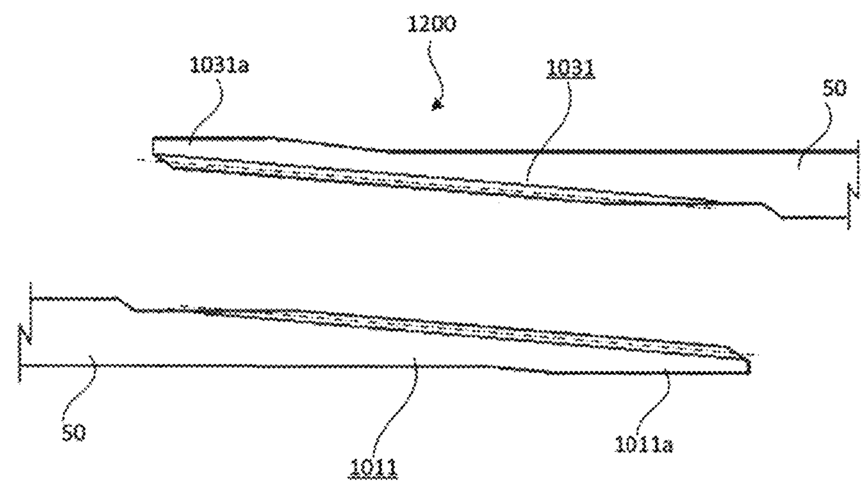
FIG. 6 is a diagram illustrating a steel pipe joint structure 1200 according to a comparative example.

FIG. 6 is a diagram illustrating a steel pipe joint structure 1200 according to a comparative example. To avoid the situation shown in FIG. 4, in which the critical section has a small wall thickness, it is possible to consider adopting a box 1031 having a distal end portion 1030 with an increased diameter as shown in FIG. 6, and adopting a pin 1011 having a distal end portion 1011*a* with a reduced diameter as shown in FIG. 6. In the box 1031 according to the comparative example, the diameter of the distal end portion 1031*a* is changed, so that the box 1031 has a tapered thread extending from the distal end portions 1031*a* to the pipe part 50. In the pin 1011 according to the comparative example, the diameter of the distal end portion 1011*a* is changed, so that the pin 1011 has a tapered thread extending from the distal end portion 1011*a* to the pipe part 50. Therefore, in the steel pipe joint structure 1200 according to the comparative example, it is possible to ensure the engagement between the internal thread and the external thread within a range from the distal end portion to the pipe part. Further, a configuration is adopted in which the distal end portion of the internal thread is caused to have an increased diameter in advance, and the distal end portion of the external thread is caused to have a reduced diameter in advance, thus forming a tapered thread. However, in the steel pipe joint structure 1200 according to the comparative example, pipe ends 1010*a* and 1030 have an increased diameter or a reduced diameter and hence, unlike the steel pipe joint structure 100 according to Embodiment 1, it is impossible to provide the structure in which the pin rear shoulder surface 22 and the box front shoulder surface 42 are sufficiently brought into contact with each other, and the structure in which the pin front shoulder surface 23 and the box rear shoulder surface 43 are sufficiently brought into contact with each other and hence, a sufficient metal seal cannot be achieved. Accordingly, the steel pipe joint structure 1200 according to the comparative example has a problem in sealing performance.

(Thread Engagement Method)

Figure 7A:
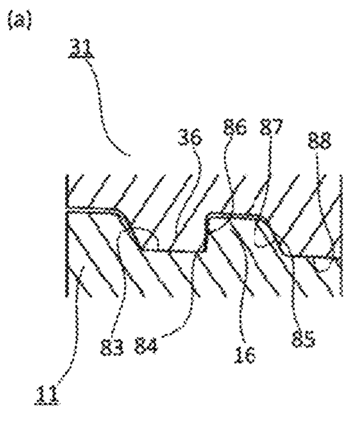
FIGS. 7(*a*) and 7(*b*) are a cross-sectional view showing an example of engagement between complete threads.
Figure 7B:
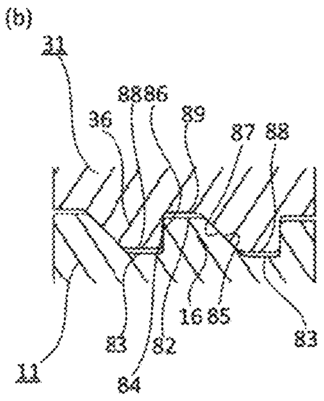
Figure 7B:
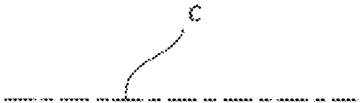

FIGS. 7(*a*) and 7(*b*) are a cross-sectional view showing an example of the engagement between complete threads. FIG. 7(*a*) shows an engaged state between threads by a method in which the root and the crest of the threads are brought into contact with each other (root to crest contact), and FIG. 7(*b*) shows an engaged state between threads by a method in which a stabbing flank and a load flank are brought into contact with each other (flank to flank contact). Examples of a method of the thread engagement include the root to crest contact method, in which the crest of the screw thread of a box and the root of the screw thread of a pin are brought into contact with each other as shown in FIG. 7(*a*), and the flank to flank contact method, in which the inclined surface of the screw thread of a box and the inclined surface of the screw thread of a pin are brought into contact with each other. Embodiment 1 adopts engagement by the flank to flank contact method that is advantageous in sealing performance and compression performance of the steel pipe joint structure 100.

The steel pipe joint structure 100 according to Embodiment 1 adopts the flank to flank contact method and hence, a screw thread has a cross sectional shape in which the stabbing flank and the load flank are inclined relative to the direction orthogonal to the pipe axis C of the thread, that is, a trapezoidal thread or a triangular thread is adopted. Note that a square thread in which the flank angle is perpendicular to the pipe axis C cannot achieve fitting by the flank to flank contact.

(Complete Thread Part)

Figure 8:
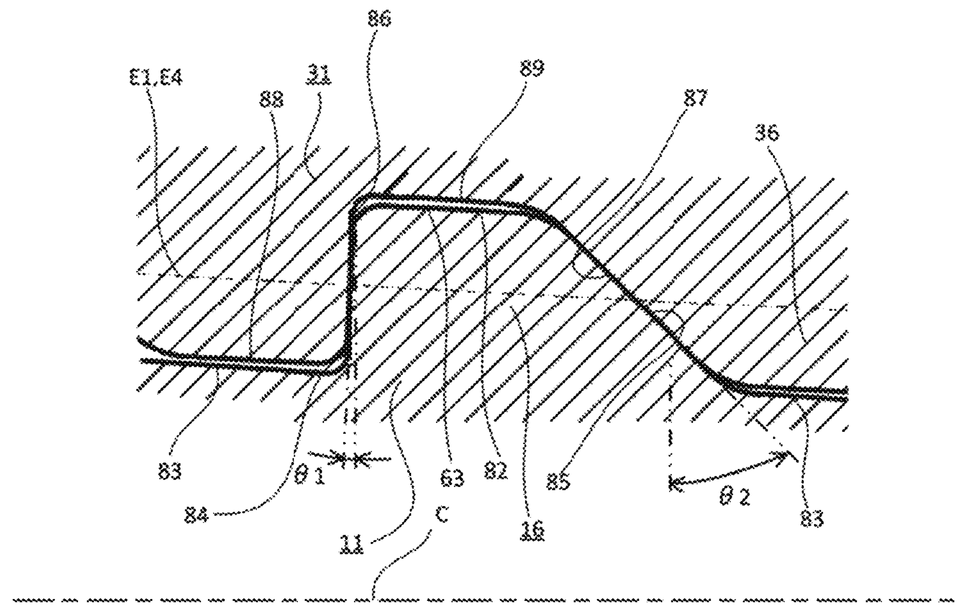
FIG. 8 is a cross-sectional view showing an engaged state between complete threads at a portion A in FIG. 2 and FIG. 5.

FIG. 8 is a cross-sectional view showing an engaged state between complete threads at a portion A in FIG. 2 and FIG. 5. In the engagement between complete thread parts having the same effective diameter as in the case of the engagement between the pin complete thread part 16 and the box complete thread part 36, appropriate engagement is made with the combination of an external-thread load surface 84 and an internal-thread load surface 86, and with the combination of an external-thread stabbing surface 85 and an internal-thread stabbing surface 87. The steel pipe joint structure 100 according to Embodiment 1 adopts the flank to flank contact method, so that the shape of the screw thread in cross section including the pipe axis C is such that a load flank angle θ1 between the external thread and the internal thread and a stabbing flank angle θ2 between the external thread and the internal thread are inclined relative to the direction orthogonal to the pipe axis C.

(Incomplete Thread Part)

Figure 9:
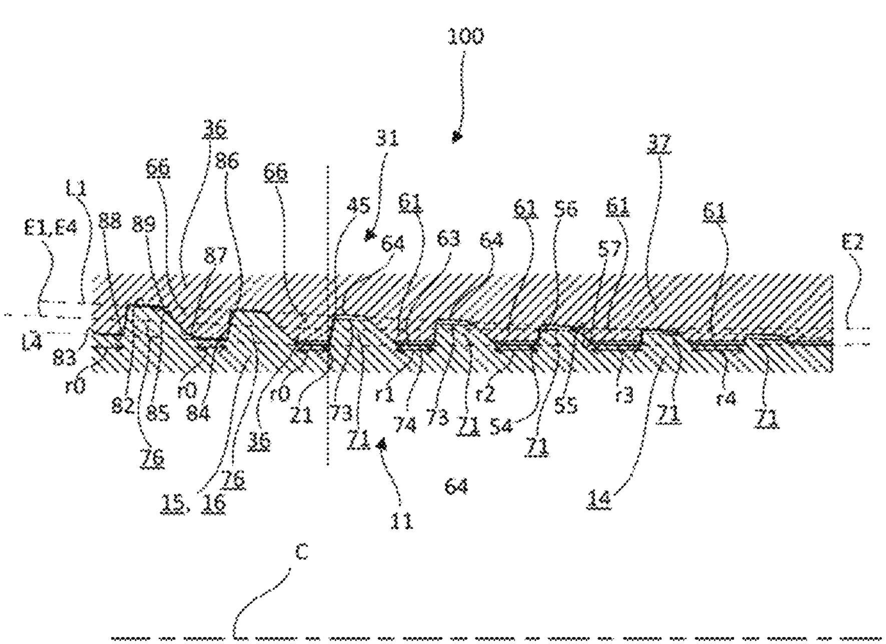
FIG. 9 is a cross-sectional view showing an example of an engaged state between incomplete threads at a portion B in FIG. 2 and FIG. 5.

FIG. 9 is a cross-sectional view showing an example of an engaged state between incomplete threads at a portion B in FIG. 2 and FIG. 5. In FIG. 9, the tapered thread, and the pin front incomplete tapered thread part 15, being a screw thread reduced in height due to crest cutting, are omitted. At the portion B in FIG. 2 and FIG. 5, both the external thread and the internal thread are incomplete thread parts, and the pin 11 has the pin front parallel thread part 14 and the box 31 has the box rear incomplete thread part 37. The pin front parallel thread part 14 that is located on the distal end side of the pin 11 is a parallel thread, and is also an incomplete thread. In contrast, the box rear incomplete thread part 37 that is located on the pipe part 50 side of the box 31 is a tapered thread, and is also an incomplete thread. The internal thread of the box 31 has an effective diameter E4 that is inclined relative to the pipe axis C, and the external thread of the pin has an effective diameter E2 that is parallel to the pipe axis C. Due to this deviation between the effective diameter E4 and the effective diameter E2, there is a deviation in stabbing surfaces between the external thread and the internal thread, and there is a deviation in load surfaces between the external thread and the internal thread. In view of the above, in Embodiment 1, as shown in FIG. 9, the pin front parallel thread part 14 of the external thread part 13 is processed in such a way as to cause a load surface 54 of the external thread to move in conformity with a load surface 56 of the internal thread. This processing will be described later. A stabbing surface 55 of the external thread is also processed in such a way as to be moved in conformity with a stabbing surface 57 of the internal thread. That is, screw threads 71 of the pin front parallel thread part 14 of the pin 11 in Embodiment 1 are processed to have smaller widths than complete screw threads 76 of the pin complete thread part 16, which are formed at the center portion of the external thread part 13 formed on the pin 11. To be more specific, the width of the screw thread 71 of the pin front parallel thread part 14 on the effective diameter E2 is smaller than the width of the complete screw thread 76 of the pin complete thread part 16 on the effective diameter E1 (see FIG. 5 and FIG. 8). In FIG. 9, the load surface 54 of the external thread conforms with the load surface 56 of the internal thread. In the same manner, the stabbing surface 55 of the external thread is also processed in such a way as to conform with the stabbing surface 57 of the internal thread.

In other words, roots 74 of the pin front parallel thread part 14 of the pin 11 in Embodiment 1 are processed to have larger widths than roots 83 of the pin complete thread part 16 formed at the center portion of the external thread formed on the pin 11. For example, a width r1 of the root 74 of the pin front parallel thread part 14 is larger than a width r0 of the root 83 of the pin complete thread part 16. In the same manner, each of other roots r2 to r4 of the pin front parallel thread parts 14 is larger than the width r0 of the root 83 of the pin complete thread part 16. Further, the widths r1 to r4 of the roots 74 of the pin front parallel thread part 14 are set such that the widths increase toward the distal end side of the pin 11. That is, the relationship of the widths of the roots 74 satisfies $r1<r2<r3<r4$. By forming the pin front parallel thread part 14 as described above, screw threads 61 of the box rear incomplete thread part 37 can be threadedly engaged with the valleys of the pin front parallel thread part 14.

In FIG. 9, the box rear incomplete thread part 37 is a portion obtained by forming a tapered thread at the cylindrical part of the box 31 by cutting. Accordingly, the widths of roots 64 of the box rear incomplete thread part 37 are equal to the widths of roots 89 of the box complete thread part 36.

By forming the box rear incomplete thread part 37 as described above, the thread of the pin front parallel thread part 14 of the pin 11 and the thread of the box rear incomplete thread part 37 of the box 31 are engaged with each other to near the point at which the threads reach the pin front shoulder surfaces 23 and 43. Consequently, not only that a sufficient engagement length of the threads can be ensured, but also that each of the pin 11 and the box 31 can ensure a sufficient wall thickness of the critical section. Therefore, the steel pipe joint structure 100 can sufficiently withstand a tensile load applied after fastening. Further, the steel pipe joint structure 100 can increase fastening torque. Thus, the steel pipe joint structure 100 can enhance sealability and pressure resistance.

In Embodiment 1, as shown in FIG. 9, the region from the distal end side of the pin 11 to the connection part 21 is a size reduction processing region in which processing is performed such that the widths of the screw threads 71 on the effective diameter E2 are smaller than widths of the complete screw threads 76 of the pin complete thread part 16. However, the size reduction processing region may be provided to extend beyond the connection part 21 toward the pin rear part 18. That is, the size reduction processing may also be performed on at least a portion of the pin front incomplete tapered thread part 15, being the tapered thread part shown in FIG. 2, or on a portion of the pin complete thread part 16. In this case, at least a portion of the pin front incomplete tapered thread part 15 shown in the section P2 in FIG. 2 or a portion of the pin complete thread part 16 shown in the section P3 in FIG. 2 is processed such that the widths of the screw threads 71 on the effective diameter E1 are smaller than the widths of the complete screw threads 76 of the pin complete thread part 16. That is, in Embodiment 1, in the case in which the whole or a portion of the section P2 in FIG. 2 corresponds to the incomplete thread on which the size reduction processing is performed, there may be cases in which a portion in the section P3 in FIG. 2 also corresponds to the incomplete thread on which the size reduction processing is performed. With such a configuration, it is possible to adjust the size reduction processing region of the external thread part 13 corresponding to the length of the box rear incomplete thread part 37 (the section B4) of the box 31 that is engaged with the region of the external thread part 13 of the pin 11 on the distal end side. Consequently, the screw threads 71 in the region of the external thread part 13 of the pin 11 on the distal end side can avoid interference with the screw threads 61 of the box rear incomplete thread part 37 of the box 31.

In FIG. 9, crest cutting is performed on the pin front parallel thread part 14 such that a crest part 73 of each screw thread 71 is prevented from coming into contact with the root 64 of the box rear incomplete thread part 37. Before thread cutting is performed on the pin 11, the crest cutting is performed on a blank within the range where the pin front parallel thread part 14 is to be provided. The crest cutting will be described later.

The box rear incomplete thread part 37 that is engaged with the pin front parallel thread part 14 is a tapered thread formed continuously from the box complete thread part 36, thus having a diameter of the root that decreases toward the box rear part 38, that is, toward the pipe part 50. The roots 64 of the box rear incomplete thread part 37 are located on a straight line L1 shown in FIG. 9, and are located on the same straight line L1 as the roots 89 of the box complete thread part 36. The crest parts 73 of the pin front parallel thread part 14 obtained by performing the crest cutting are located at positions that do not interfere with the roots 64 of the box rear incomplete thread part 37, being the tapered thread. The respective roots 74 of the pin front parallel thread part 14 are located on a cylindrical surface (are formed to have the same outer diameter), and are configured to prevent interference with the crest parts 63 of the screw threads 61 of the box rear incomplete thread part 37 that are also located on the cylindrical surface. The pin front parallel thread part 14 is formed by cylindrical processing, thus being formed such that the roots 74 have a single outer diameter (see the portion of L4 to the right of the connection part 21, shown in FIG. 9).

As described above, by adjusting the widths of the screw threads 71 of the pin front parallel thread part 14, the pin front parallel thread part 14 and the box rear incomplete thread part 37 can avoid interference between the screw threads 61 of the internal thread and the screw threads 71 of the external thread. It is also possible to avoid interference between the crest parts 73 of the screw threads 71 of the external thread and the roots 64 of the internal thread. In Embodiment 1, the thread shapes of the pin front parallel thread part 14 and the box rear incomplete thread part 37 are set such that, for example, the stabbing flank angle θ2 is 45 degrees, and the load flank angle θ1 is 2 degrees.

The above-mentioned relationship between the box rear incomplete thread part 37 and the pin front parallel thread part 14 is also established for the engagement between the incomplete thread part of the box front parallel thread part 34 and the incomplete thread part of the pin rear incomplete thread part 17 in the same manner. The engagement between the box front parallel thread part 34 and the pin rear incomplete thread part 17 is the engagement between the incomplete threads at a portion C in FIG. 2 and FIG. 5, so that a parallel thread shown on the lower side in FIG. 9 corresponds to the box front parallel thread part 34, and a tapered thread shown on the upper side in FIG. 9 corresponds to the pin rear incomplete thread part 17. In this case, the box front parallel thread part 34, being the internal thread, is processed in such a way as to cause the load surface 56 of the internal thread to move in conformity with the load surface 54 of the external thread. The stabbing surface 57 of the internal thread is also processed in such a way as to be moved in conformity with the stabbing surface 55 of the external thread. That is, the box front parallel thread part 34 of the box 31 in Embodiment 1 is processed to have smaller widths than complete screw threads 66 of the box complete thread part 36 formed at the center portion of the internal thread in the direction of the pipe axis C, the internal thread being formed on the box 31. To be more specific, the widths of the screw threads 71 of the box front parallel thread part 34 on an effective diameter E3 (see FIG. 5) are smaller than the widths of the complete screw threads 66 of the box complete thread part 36 on the effective diameter E4 (see FIG. 5).

The size reduction processing region of the internal thread part 33 of the box 31 may be provided to extend beyond the connection part 41 (see FIG. 5) toward the box rear part 38. That is, the size reduction processing may also be performed on at least a portion of the box front incomplete tapered thread part 35, being the tapered thread part shown in FIG. 5, or on a portion of the box complete thread part 36. In this case, at least a portion of the box front incomplete tapered thread part 35 shown in the section B2 in FIG. 5 or a portion of the box complete thread part 36 shown in the section B3 in FIG. 5 is processed such that the widths of the screw threads 71 on the effective diameter E4 are smaller than widths of the complete screw threads 76 of the box complete thread part 46. That is, in Embodiment 1, in the case in which the whole or a portion of the section B2 in FIG. 5 corresponds to the incomplete thread on which the size reduction processing is performed, there may be cases in which a portion of the section B3 in FIG. 5 also corresponds to the incomplete thread on which the size reduction processing is performed. With such a configuration, it is possible to adjust the size reduction processing region of the internal thread part 33 corresponding to the length of the pin rear incomplete thread part 17 of the pin 11 that is engaged with the region of the internal thread part 33 of the box 31 on the distal end side. Consequently, the screw threads 71 in the region of the internal thread part 33 of the box 31 on the distal end side can avoid interference with the screw threads 61 of the pin rear incomplete thread part 17 of the pin 11.

Figure 10:
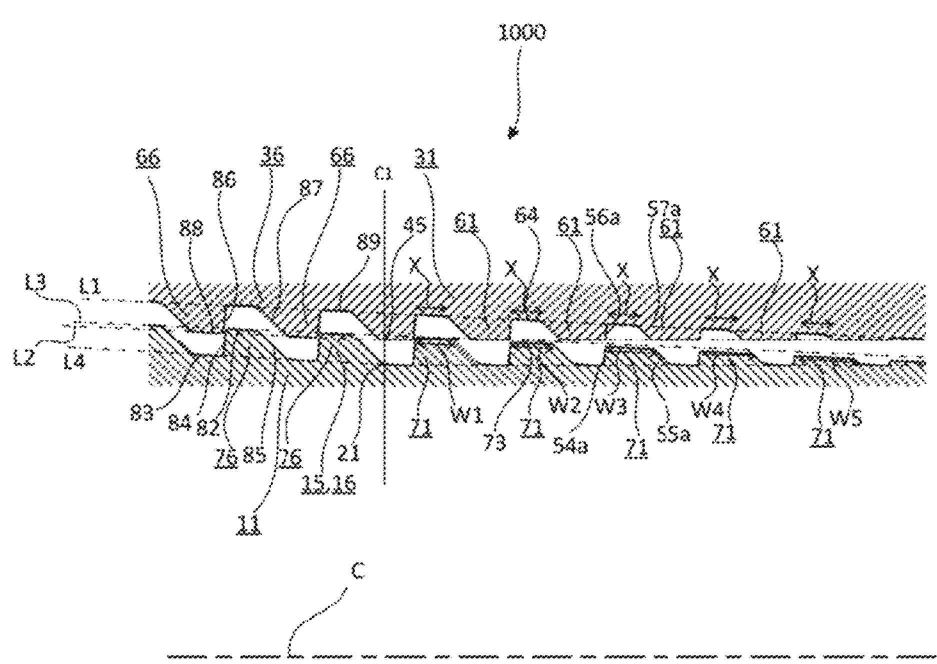
FIG. 10 is a diagram illustrating an engaged state between a complete thread part and an incomplete thread part of a steel pipe joint structure 1000 according to the comparative example at a position in the vicinity of a connection part.

FIG. 10 is a diagram illustrating an engaged state between the complete thread part and the incomplete thread part of a steel pipe joint structure 1000 according to the comparative example at a position in the vicinity of a connection part 21. FIG. 10 is an enlarged view of a portion corresponding to the connection part 21 shown in FIG. 2, a connection part 45 shown in FIG. 4, and an area around the connection part 21 and the connection part 45. That is, FIG. 10 shows an area around the boundary between the complete thread part and the incomplete thread part that are located at the front part of the pin 11, and shows an area around the boundary between the complete thread part and the incomplete thread part that are located at the rear part of the box 31. In the steel pipe joint structure 1000 according to the comparative example, the size reduction processing is not performed on the pin front parallel thread part 14. Consequently, the pin front parallel thread part 14 and the box rear incomplete thread part 37 shown in FIG. 10 have the relationship in which screw threads are not engaged with each other.

Figure 11:
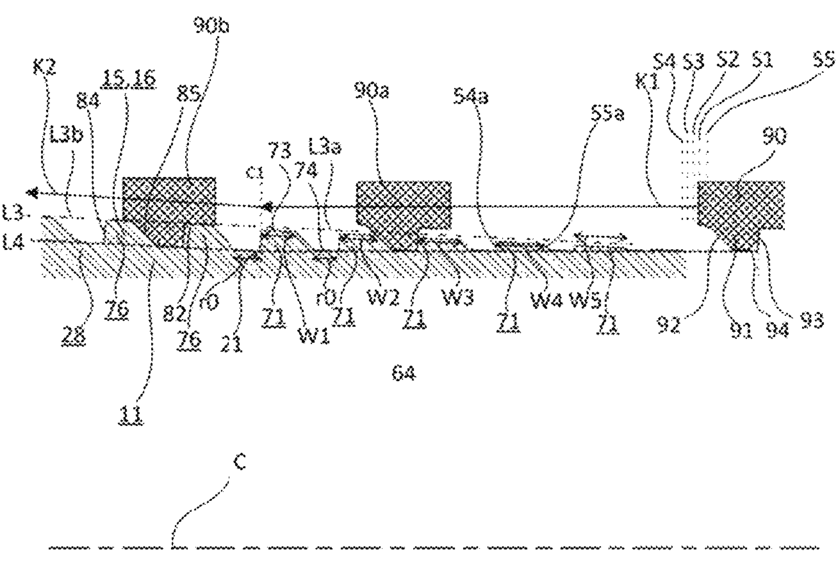
FIG. 11 is a diagram illustrating processing performed for the screw thread formed in the vicinity of a connection part 21 of the pin 11 according to Embodiment 1 and the comparative example.

FIG. 11 is a diagram illustrating processing performed for the screw thread formed in the vicinity of the connection part 21 of the pin 11 according to Embodiment 1 and the comparative example. The external thread part 13 of the pin 11 according to Embodiment 1 is formed by performing thread cutting machining with a thread cutting insert 90. Arrows K1 and K2 shown in FIG. 11 show loci of the thread cutting insert 90 in the thread cutting machining. The thread cutting insert 90 has an edge 91 having the same shape as the cross sectional shape of the valley part of the thread, and is moved along the arrows K1 and K2 to form a screw thread on the pin 11. A thread cutting insert 90*a* in FIG. 11 shows the thread cutting insert 90 moving along the arrow K1, and a thread cutting insert 90*b* shows the thread cutting insert 90 moving along the arrow K2.

As shown in FIG. 11, the thread cutting insert 90 is moved parallel to the pipe axis C as shown by the arrow K1 to the connection part 21 of the external thread part 13, the connection part 21 being the boundary between the pin front parallel thread part 14 and the tapered thread part 28. Thus, the thread cutting insert 90 forms a parallel thread. After passing through the connection part 21, the thread cutting insert 90 is moved obliquely relative to the pipe axis C as shown by the arrow K2. Thus, the thread cutting insert 90 forms a tapered thread. The pin front parallel thread part 14 corresponds to the portion shown in the section P1 in FIG. 2. The tapered thread part 28 corresponds to the portion shown in the sections P2 to P4 in FIG. 2. The pin 11 has the pin front parallel thread part 14 formed at the distal end portion thereof, thus increasing the length of the external thread part 13 without reducing a wall thickness.

In FIG. 11, the width of the root 74 of the pin front parallel thread part 14 (the portion to the right of the connection part 21 in FIG. 11) is equal to the width of the root 83 of the pin complete thread part 16 (the portion to the left of the connection part 21 in FIG. 11). By performing the size reduction processing on the pin 11 shown in FIG. 11, it is possible to obtain the shape of a screw thread in which the width of the root 74 is larger than the width of root 83 of the pin complete thread part 16, in the same manner as the pin front parallel thread part 14 shown in FIG. 9 or the like.

Figure 12:
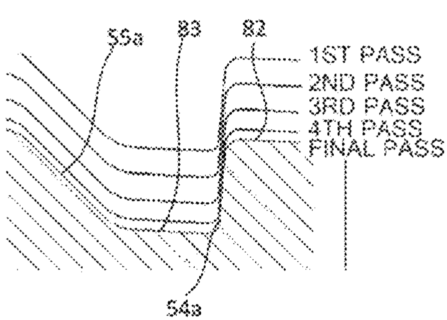
FIG. 12 is a diagram illustrating an example of processing that uses a thread cutting insert 90 according to Embodiment 1 and the comparative example.

FIG. 12 is a diagram illustrating an example of processing that uses the thread cutting insert 90 according to Embodiment 1 and the comparative example. The processing with the thread cutting insert 90 shown in FIG. 11 is performed by dividing the processing into a plurality of passes by taking into account lifespan of the thread cutting insert 90 and accuracy (in external appearance and in dimensions) of the thread after processing. For example, the screw thread shown in FIG. 12 shows the case in which the final thread shape is formed with five passes. In FIG. 12, the final pass has a smaller cutting margin compared with other passes to enhance accuracy.

As shown in FIG. 10, each of the external thread part 13 and the internal thread part 33 of the steel pipe joint structure 1000 according to the comparative example has an inclined load surface and an inclined stabbing surface. Accordingly, when normal thread cutting is performed on the incomplete thread part of the external thread part 13, the width of the crest of the screw thread increases as the height of the screw thread decreases as in the case of W1 to W5 shown in FIG. 10. This occurs because the processing is performed by setting the initial position of the thread cutting insert 90 at S1 in the diagram illustrating the processing shown in FIG. 11, thus the shape of the edge 91 of the thread cutting insert 90 is given to the external thread part 13. When the processing is performed with the initial position of the thread cutting insert 90 remaining at S1, the widths W1 to W5 of the crest parts 73 of the incomplete thread part of the pin 11 become larger than a width X of the root 64 of the box rear incomplete thread part 37. Accordingly, the pin front parallel thread part 14 of the steel pipe joint structure 1000 according to the comparative example cannot be threadedly engaged with the box rear incomplete thread part 37.

Figure 13:
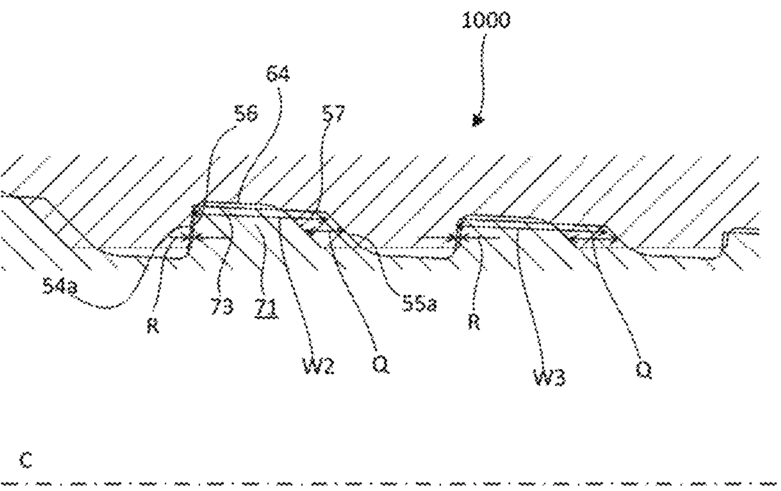
FIG. 13 is a diagram illustrating the size relationship between the screw thread of a pin front parallel thread part 14 and the screw thread of a box rear incomplete thread part 37 of the steel pipe joint structure 1000 according to the comparative example shown in FIG. 10.

FIG. 13 is a diagram illustrating the size relationship between the screw thread of the pin front parallel thread part 14 and the screw thread of the box rear incomplete thread part 37 in the steel pipe joint structure 1000 according to the comparative example shown in FIG. 10. In the case of the external thread part 13 of the steel pipe joint structure 1000 according to the comparative example, as shown in FIG. 13, the widths W1 to W5 of the crests of the screw thread of the pin front parallel thread part 14 are larger than the width of the root 64 of the box rear incomplete thread part 37. Consequently, the load flank of the external thread and the load flank of the internal thread interfere with each other by the width shown by "R" in FIG. 13, and the stabbing flank of the external thread and the stabbing flank of the internal thread interfere with each other by the width shown by "Q" in FIG. 13. To avoid the interference between the load flanks and the interference between the stabbing flanks shown in FIG. 13, size reduction processing, which will be described below, is performed on the pin front parallel thread part 14 of the steel pipe joint structure 100 according to Embodiment 1.

Figure 14:
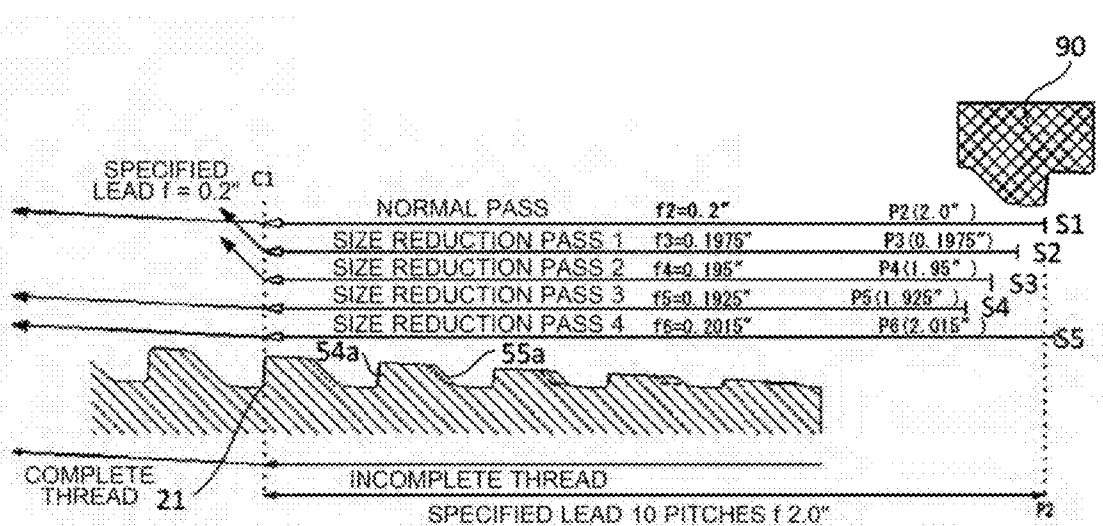
FIG. 14 is a diagram illustrating an example of processing performed on an external thread part 13 according to Embodiment 1.

FIG. 14 is a diagram illustrating an example of processing performed on the external thread part 13 according to Embodiment 1. The size reduction processing is performed on the pin front parallel thread part 14 of the steel pipe joint structure 100 according to Embodiment 1 such that the load surface 54 and the stabbing surface 55 conform with the load surface 56 and the stabbing surface 57 of the box rear incomplete thread part 37. For example, the size reduction processing reduces the size of the screw thread with three passes to reduce the size of the stabbing surface 55, and with one pass to reduce the size of the load surface 54.

The pass at the top in FIG. 14 shows a normal pass, and is a pass to form a screw thread before the size reduction processing is performed. In the normal pass, the thread cutting insert 90 starts to move from S1, being the reference position, and is moved at f2=0.2" (in the case of a screw having five threads per inch) when feeding of the tool is expressed in terms of pitch.

The second pass from the top in FIG. 14 is a first size reduction pass for the stabbing surface 55. In the first size reduction pass, the thread cutting insert 90 starts to move from S2, which is closer to the pin 11 than S1, and is moved at a tool feed pitch of f3=0.1975". In the first size reduction pass, the movement start position S2 of the thread cutting insert 90 is moved toward the pin 11 and hence, the thread cutting insert 90 performs cutting in the direction in which the stabbing surface 55 of the screw thread is reduced.

The third and fourth passes from the top in FIG. 14 are second and third size reduction passes. In the second size reduction pass, the movement start position of the thread cutting insert 90 is moved to S3 that is even closer to the pin 11 than the movement start position in the first size reduction pass. In the third size reduction pass, the movement start position of the thread cutting insert 90 is moved to S4 that is even closer to the pin 11 than the movement start position in the second size reduction pass. A tool feed pitch is set to f4=0.195" in the second size reduction pass, and a tool feed pitch is set to f5=0.1925" in the third size reduction pass. That is, in the size reduction passes, the stabbing surface 55 is cut by causing the movement start position of the thread cutting insert 90 to gradually approach the pin 11. Further, a setting is made such that a tool feed pitch is reduced (a feeding speed is reduced) by an amount corresponding to the approach of the movement start position of the thread cutting insert 90 to the pin 11, thus reducing a cutting amount as the screw thread approaches the connection part 21.

The pass at the bottom in FIG. 14 is a size reduction pass for the load surface 54. In the size reduction pass for the load surface 54, the movement start position of the thread cutting insert 90 is moved away from the pin 11, and a feed pitch is set to f6=0.2015", that is, a feeding speed is slightly increased. Therefore, cutting is performed in the direction in which the load surface 54 is reduced.

In the normal pass, the third size reduction pass for the stabbing surface 55 (the final size reduction pass for the stabbing surface 55), and the size reduction pass for the load surface 54 (the final size reduction pass for the load surface 54) in FIG. 14, the tool is fed at a normal feed pitch of f=0.2" at the connection part 21, and processing is also continuously performed on the complete thread part. By continuously performing processing also on the complete thread part in each of the size reduction processing for the load surface 54 and the size reduction processing for the stabbing surface 55 as described above, the pin front parallel thread part 14 and the pin front incomplete tapered thread part 15, which are incomplete thread parts, and the pin complete thread part 16 are processed to be smoothly connected with each other. When the thread cutting insert 90 reaches the connection part 21, being the boundary between the incomplete thread part and the complete thread part, a feeding speed is returned to the normal feeding speed and hence, the shape of the screw thread of the complete thread part is not impaired. The connection part 21 is a position at which an incomplete parallel thread and a complete tapered thread are connected with each other, and is shown by a line C1 in FIG. 14. However, the size reduction processing performed on the pin front parallel thread part 14 may extend beyond the connection part 21, and may also be performed on a region of the complete thread (the tapered thread parts 15, 16) shown in FIG. 14 corresponding to the length of the box rear incomplete thread part 37 in which the pin front parallel thread part 14 is fitted. That is, in the external thread part 13 according to Embodiment 1, the screw thread on which the size reduction processing is performed may also be formed in the region of the section P2 or the section P3 in FIG. 2.

As described above, the external thread part 13 formed at the end portion of the steel pipe is processed by the thread cutting insert 90. First, the thread cutting insert 90 is caused to move from S1, being the initial position, at a feed pitch of f2=0.2, being a first feeding speed, to continuously process the pin front parallel thread part 14 and the tapered thread parts 15, 16, and 17 on the external thread part 13. This pass is referred to as "normal processing pass". The normal processing pass may include a plurality of normal processing passes. In Embodiment 1, the 1st pass to the final pass in FIG. 12 and the 1st pass to the 5th pass in FIG. 15 correspond to the plurality of normal processing passes.

Next, the movement of the thread cutting insert 90 is started from a processing start position closer to the steel pipe than the initial position, thus processing at least the pin front parallel thread part 14 on the external thread part 13 at a second feeding speed, which is lower than the first feeding speed. This pass is referred to as "first size reduction processing pass". The first size reduction processing pass may include a plurality of first size reduction processing passes started from a plurality of positions closer to the steel pipe than the initial position. In this case, the second feeding speed includes a plurality of second feeding speeds lower than the first feeding speed. In Embodiment 1, a size reduction pass 1 starting from S2 and a size reduction pass 2 starting from S3 in FIG. 14 correspond to the plurality of first size reduction processing passes. The first size reduction processing pass is a processing pass for cutting the stabbing flank of the pin front parallel thread part 14. However, the first size reduction processing pass applied to the pin front parallel thread part 14 may extend beyond the connection part 21, and may also be applied to a region of the complete thread (the tapered thread parts 15, 16) shown in FIG. 14 corresponding to the length of the box rear incomplete thread part 37 into which the pin front parallel thread part 14 is fitted. That is, in the first size reduction processing pass, the region in which processing is performed at the second feeding speed may extend beyond the connection part 21.

Next, the movement of the thread cutting insert 90 is started from a processing start position closer to the steel pipe than the initial position, thus processing the pin front parallel thread part 14 on the external thread part 13 at the second feeding speed, which is lower than the first feeding speed, and then continuously processing the tapered thread parts 15, 16, and 17 on the external thread part 13 at the first feeding speed. This pass is referred to as "second size reduction processing pass". In Embodiment 1, a size reduction processing pass 3 starting from S4 in FIG. 14 corresponds to the second size reduction processing pass. The second size reduction processing pass allows the pin front parallel thread part 14, on which the size reduction processing is performed, and the tapered thread parts 15, 16, and 17 to be continuously processed, thus allowing the screw threads to connect with each other with a smooth surface at the connection part 21. The second size reduction processing pass is a processing pass for cutting the stabbing flanks of the pin front parallel thread part 14 and the tapered thread parts 15, 16, and 17. However, the second size reduction processing pass applied to the pin front parallel thread part 14 may extend beyond the connection part 21, and may also be applied to a region of the complete thread (the tapered thread parts 15, 16) shown in FIG. 14 corresponding to the length of the box rear incomplete thread part 37 into which the pin front parallel thread part 14 is fitted. That is, in the second size reduction processing pass, the region in which processing is performed at the second feeding speed may extend beyond the connection part 21.

Next, the movement of the thread cutting insert 90 is started from a processing start position located farther from the steel pipe than the initial position, thus processing the pin front parallel thread part 14 on the external thread part 13 at a third feeding speed being higher than the first feeding speed, and continuously processing the tapered thread parts 15, 16, and 17 on the external thread part 13 at the first feeding speed. This pass is referred to as "third size reduction processing pass". In Embodiment 1, the third size reduction processing pass is a size reduction pass 4 starting from S5 in FIG. 14, and is a pass for processing the load flank. Further, the third size reduction processing pass allows the pin front parallel thread part 14, on which the size reduction processing is performed, and the tapered thread parts 15, 16, and 17 to be continuously processed, thus allowing the screw threads to connect with each other with a smooth surface at the connection part 21. Depending on the cutting margin of the load flank, the third size reduction processing pass may be configured such that only the pin front parallel thread part 14 is performed a plurality of times, and the pin front parallel thread part 14 and the tapered thread parts 15, 16, and 17 are continuously processed as the last step. However, the third size reduction processing pass applied to the pin front parallel thread part 14 may extend beyond the connection part 21, and may also be applied to a region of the complete thread (the tapered thread parts 15, 16) shown in FIG. 14 corresponding to the length of the box rear incomplete thread part 37 into which the pin front parallel thread part 14 is fitted. That is, in the third size reduction processing pass, the region in which processing is performed at the third feeding speed may extend beyond the connection part 21.

Although the description has been made heretofore for the case in which the external thread part 13 is processed, the internal thread part 33 is also processed in the same manner. In the processing performed on the internal thread part 33, the box front parallel thread part 34 and the tapered thread parts 35, 36, and 37 are processed with the above-mentioned normal processing pass, first size reduction processing pass, second size reduction processing pass, and third size reduction processing pass.

Figure 15:
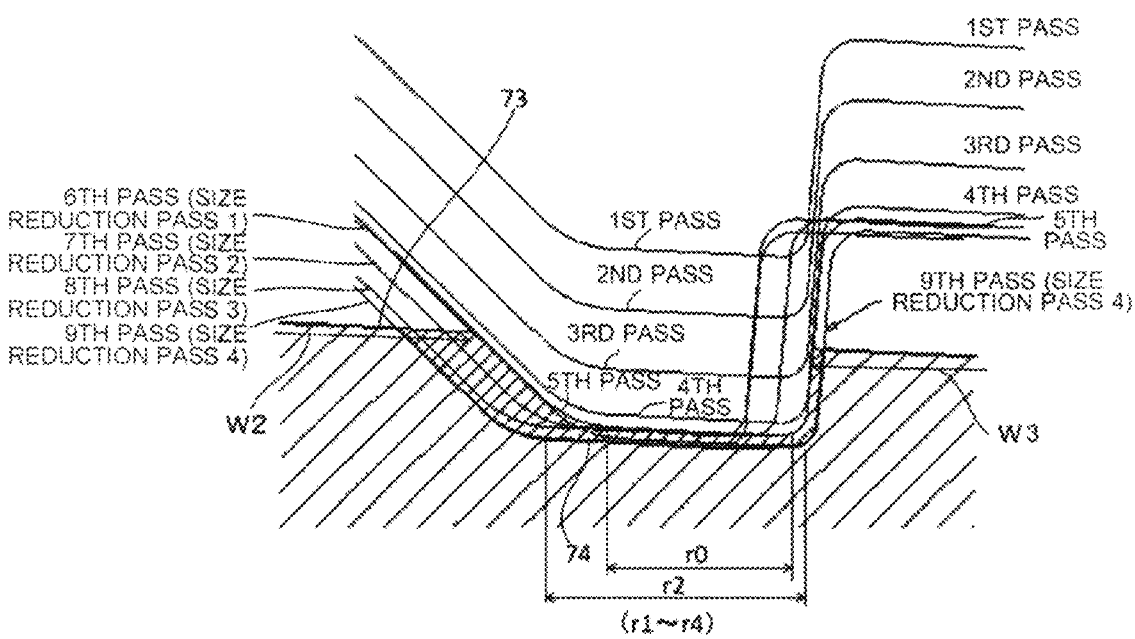
FIG. 15 is a diagram showing processing steps caused by all processing passes by focusing on one valley of the pin front parallel thread part 14 shown in FIG. 14.

FIG. 15 is a diagram showing processing steps performed by all processing passes by focusing on one valley of the pin front parallel thread part 14 shown in FIG. 14. In FIG. 15, the valley of the pin front parallel thread part 14 is representatively focused on, which has the width of the root 74 of r2. However, other valleys are also processed with basically similar processing passes, although the cutting amount changes. The 1st pass to the 5th pass shown in FIG. 15 correspond to the normal pass shown in FIG. 14. The normal pass shown in FIG. 14 is divided into five passes as shown in FIG. 12 and FIG. 15, for example, to perform cutting on a blank. The size reduction processing is performed on the screw thread after a normal screw thread is formed. In the 1st pass to 5th pass, corresponding to the normal pass, the root 74 is processed to have the normal width r0 equal to that of the root 83 (the root 83 of the complete thread part). Thereafter, the root 74 is processed to have the width r2 larger than the width r0 with the 6th pass to the 9th pass, corresponding to the size reduction passes. Valleys other than the valley shown in FIG. 15 are also processed to have the widths r1 to r4 larger than the width r0 by the size reduction processing in the same manner.

Figures 16A, 16B:
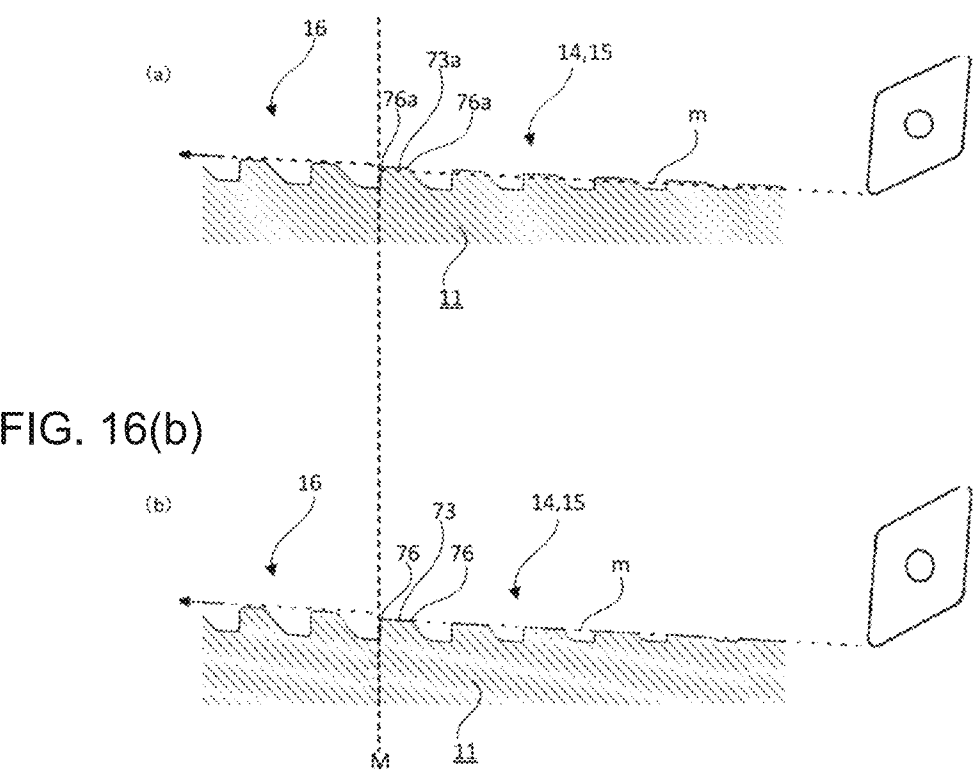
FIGS. 16(*a*) and 16(*b*) are a diagram illustrating blank processing performed before screw thread processing according to Embodiment 1 is performed.

FIGS. 16(*a*) and 16(*b*) are a diagram illustrating blank processing that is performed before screw thread processing according to Embodiment 1 is performed. When the pin front parallel thread part 14 of the pin 11 according to Embodiment 1 is just the result of being formed by normal screw thread processing, the crest part 73 of the screw thread is located at a position on L3 in FIG. 9, so that a crest part 73*a* of the screw thread of the pin front parallel thread part 14 interferes with the root 64 of the box rear incomplete thread part 37. In view of the above, to prevent interference with the root 64 of the thread of the box rear incomplete thread part 37, a corner portion 76*a* of the crest part 73*a* of the pin front parallel thread part 14, for example, may be set to have a rounded convex corner shape that is larger than the rounded concave corner shape of the root. However, to allow the crest part 73*a* to have a large rounded convex corner shape as described above, it is necessary to prepare a special tool for processing the crest part 73*a* of the screw thread. Accordingly, in Embodiment 1, before screw thread processing is performed, the blank processing shown in FIGS. 16(*a*) and 16(*b*) are performed such that the crest part 73*a* of the screw thread of the pin front parallel thread part 14 shown in FIG. 16(*a*) is located at a position shown in FIG. 16(*b*), so that processing is performed without causing interference between the crest part 73 of the screw thread and the root 64 of the screw thread.

The blank of the pin 11 is, at least within a range in which the pin front parallel thread part 14 is provided, processed in such a way as to have a smaller outer diameter than the tapered surface L3 (see FIG. 9 and FIG. 10) formed by the crests of the screw threads of the pin complete thread part 16. At a position M, being the end of the incomplete thread part of the pin 11, a locus m shown in FIGS. 16(*a*) and 16(*b*) are moved outward to maintain a finishing margin for screw thread processing to be performed on the screw thread of the complete thread part. That is, the loci m shown in FIG. 16(*a*) and FIG. 16(*b*) show the outer shapes of the blank before processing is performed on the screw thread of the pin 11.

In other words, in cross section including the pipe axis C, the crest part 73 of the pin front parallel thread part 14 has a smaller outer diameter than the imaginary line L3 (see FIG. 10 and FIG. 11) on which crest parts 82 of the screw threads of the pin complete thread part 16 are located. As shown in FIG. 11, the crest part 73 of the screw thread 71 are lower than an imaginary line L3*a*, and the crest part 82 of the complete screw thread 76 aligns with an imaginary line L3*b*. Further, as shown in FIG. 2, in the pin 11, the stepped part 15*a* is formed on the outer peripheral surface of the external thread part 13 at a position closer to the pin rear part 18 than the pin front parallel thread part 14.

The position M shown in FIGS. 16(*a*) and 16(*b*) can be moved to a point closer to the pin rear part 18 than the pin front parallel thread part 14. For example, as shown in FIG. 2, in the case in which the pin front incomplete tapered thread part 15 is formed subsequently to the pin front parallel thread part 14, the position M can be moved to a position at which the tapered thread part of the pin 11 is formed.

Although the screw thread of the pin 11 has been described in the above-mentioned description, the size reduction processing and the blank processing are also performed on the box front parallel thread part 34 in the same manner. That is, the size reduction processing and the blank processing are performed on the internal thread such that the engagement between the screw threads at the portion C in FIG. 2 and FIG. 5 is substantially equal to the engagement at the portion B. In other words, the width of the root 74 of the box front parallel thread part 34 is larger than the width of the root 89 of the box complete thread part 36. Further, the crest part 73 of the box front parallel thread part 34 has a larger outer diameter than the crest part 82 of the box complete thread part 36. In addition to the above, in the box 31, the stepped part 35*a* is formed on the inner peripheral surface of the internal thread part 33 at a position closer to the box rear part 38 than the box front parallel thread part 34.

(Modification)

Figure 17:
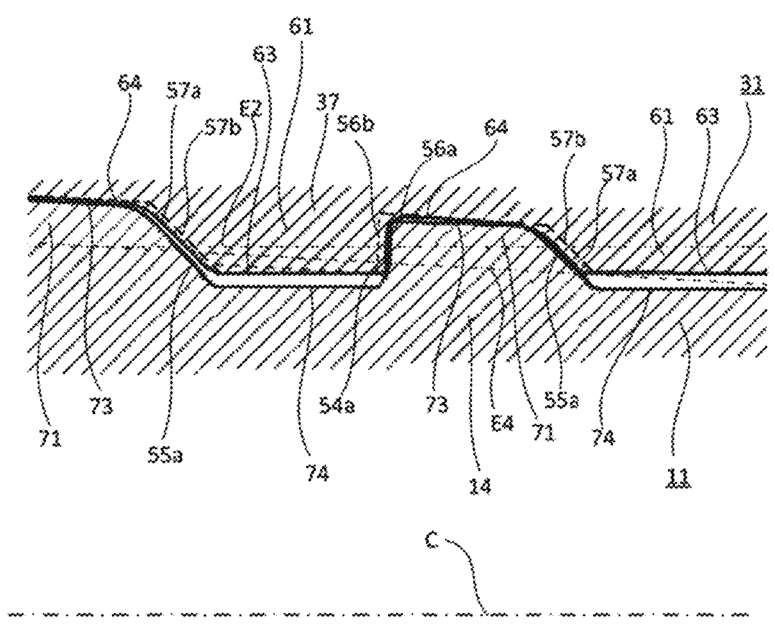
FIG. 17 is a cross-sectional view showing an example of an engaged state between incomplete threads at the portion B in FIG. 2 and FIG. 5.

FIG. 17 is a cross-sectional view showing an example of an engaged state between the incomplete threads at the portion B in FIG. 2 and FIG. 5. In the above-mentioned description, processing is performed in such a way as to cause the screw thread of the pin front parallel thread part 14 or the screw thread of the box front parallel thread part 34 to have a small width in the engagement between the pin front parallel thread part 14 and the box rear incomplete thread part 37 or in the engagement between the box front parallel thread part 34 and the pin rear incomplete thread part 17. In contrast, FIG. 17 shows an example in which processing is performed in such a way as to cause the screw thread of the box rear incomplete thread part 37 or the screw thread of the pin rear incomplete thread part 17 to have a small width. In this case, the internal thread of the box rear incomplete thread part 37 is processed in such a way as to cause a load surface 56*a* of the internal thread to be moved to conform with a load surface 54*a* of the external thread, thus forming a load surface 56*b*. A stabbing surface 57*a* of the internal thread is also processed in such a way as to be moved to conform with a stabbing surface 55*a* of the external thread, thus forming a stabbing surface 57*b*. That is, the box rear incomplete thread part 37 of the box 31 in Embodiment 1 is processed to have a smaller width of the screw thread than the box complete thread part 36 formed at the center portion of the internal thread formed on the box 31. To be more specific, the width of the screw thread 61 of the box rear incomplete thread part 37 on the effective diameter E4 (see FIG. 5) is smaller than the width of the complete screw thread 66 of the box complete thread part 36 on the effective diameter E4 (see FIG. 5). It is preferable that the blank processing described above with reference to FIGS. 16(*a*) and 16(*b*) be performed on the crest parts 73 of the screw threads 71 of the pin 11 to avoid interference with the root 64 of the internal thread of the box 31.

The relationship shown in FIG. 17 between the box rear incomplete thread part 37 and the pin front parallel thread part 14 is also established for the engagement between the incomplete thread of the box front parallel thread part 34 and the incomplete thread of the pin rear incomplete thread part 17 in the same manner.

INDUSTRIAL APPLICABILITY

According to the present disclosure, it is possible to ensure sufficient critical section area without increasing the outer diameter of the steel pipe joint structure and without increasing a wall thickness and hence, strength against a tensile load is enhanced. Further, the first steel pipe and the second steel pipe forming the steel pipe joint structure do not require necking, pipe expanding, or the like before thread cutting. In addition to the above, the steel pipe joint structure can obtain a high fastening torque and hence, sealability and pressure resistance of the steel pipe joint structure are enhanced. Accordingly, the steel pipe joint structure can be widely used as a joint structure.

REFERENCE SIGNS LIST

10: first steel pipe, 11: pin, 12: pin front part, 13: external thread part, 14: pin front parallel thread part, 15: pin front incomplete tapered thread part (tapered thread part), 15*a*: stepped part, 16: pin complete thread part (tapered thread part), 17: pin rear incomplete thread part, 18: pin rear part, 19: large diameter part, 20: small diameter part, 21: connection part, 22: pin rear shoulder surface, 23: pin front shoulder surface, 24: non-external-thread part, 28: tapered thread part, 30: second steel pipe, 31: box, 32: box front part, 33: internal thread part, 34: box front parallel thread part, 35: box front incomplete tapered thread part (tapered thread part), 35*a* stepped part, 36: box complete thread part (tapered thread part), 37: box rear incomplete thread part, 38: box rear part, 39: small diameter part, 40: large diameter part, 41: connection part, 42: box front shoulder surface, 43: box rear shoulder surface, 44: non-internal-thread part, 45: connection part, 46: box complete thread part, 48: tapered thread part, 50: pipe part, 51: inner peripheral surface, 52: outer peripheral surface, 54: load surface, 54*a*: load surface, 55: stabbing surface, 55*a*: stabbing surface, 56: load surface, 56*a*: load surface, 56*b*: load surface, 57: stabbing surface, 57*a*: stabbing surface, 57*b*: stabbing surface, 61: screw thread, 63: crest part, 64: root, 71: screw thread, 73: crest part, 73*a*: crest part, 74: root, 76: complete screw thread, 76*a*: corner portion, 82: crest part, 83: root, 84: external-thread load surface, 85: external-thread stabbing surface, 86: internal-thread load surface, 87: internal-thread stabbing surface, 89: root, 90: thread cutting insert, 90*a*: thread cutting insert, 90*b*: thread cutting insert, 91: edge, 100: steel pipe joint structure, 1000: steel pipe joint structure, 1010: first steel pipe, 1010*a*: pipe end, 1011: pin, 1011*a*: distal end portion, 1013: external thread part, 1017: complete thread part, 1030: distal end portion, 1031: box, 1031*a*: distal end portion, 1100: steel pipe joint structure, 1200: steel pipe joint structure

The invention claimed is:

1. A steel pipe joint structure that connects a first steel pipe and a second steel pipe with each other, the first steel pipe having an external thread at least at one end portion of the first steel pipe, the second steel pipe having an internal thread at least at one end portion of the second steel pipe, comprising:

in the first steel pipe, a pin front part, an external thread part having the external thread, and a pin rear part arranged in this order from a distal end of the first steel pipe, and in the second steel pipe, a box front part, an internal thread part having the internal thread, and a box rear part arranged in this order from a distal end of the second steel pipe, wherein the external thread part includes a pin front parallel thread part at an end portion on a pin front part side, the pin front parallel thread part being a parallel thread and an incomplete thread, and a pin complete thread part at a center portion of the external thread part, the pin complete thread part being a tapered thread and a complete thread, the internal thread part includes a box rear incomplete thread part at an end portion on a box rear part side, the box rear incomplete thread part being a tapered thread and an incomplete thread, and a box complete thread part at a center portion of the internal thread part, the box complete thread part being a tapered thread and a complete thread, the box rear incomplete thread part and the pin front parallel thread part are threadedly engaged with each other by engagement in which a stabbing flank of the box rear incomplete thread part and a stabbing flank of the pin front parallel thread part are brought into contact with each other, and a load flank of the box rear incomplete thread part and a load flank of the pin front parallel thread part are brought into contact with each other, and in cross section including a pipe axis, a root of the pin front parallel thread part has a larger width than a root of the pin complete thread part.

2. The steel pipe joint structure of claim 1, wherein the internal thread part further includes a box front parallel thread part at an end portion on a box front part side, the box front parallel thread part being a parallel thread and an incomplete thread, the external thread part further includes a pin rear incomplete thread part at an end portion on a pin rear part side, the pin rear incomplete thread part being a tapered thread and an incomplete thread, the box front parallel thread part and the pin rear incomplete thread part are threadedly engaged with each other, and a root of the box front parallel thread part has a larger width than a root of the box complete thread part.

3. The steel pipe joint structure of claim 2, wherein
a stepped part is formed on an inner peripheral surface of the internal thread part at a position closer than the box front parallel thread part to the box rear part.

4. The steel pipe joint structure of claim 2, wherein
the internal thread part includes a tapered thread part connected to a box rear part side of the box front parallel thread part, and
in cross section including the pipe axis, the tapered thread part includes a partial region connected to the box front parallel thread part, and a root of the tapered thread part in the partial region has a larger width than a root of the box complete thread part.

5. The steel pipe joint structure of claim 1, wherein
the pin rear part has a pin rear shoulder surface being a surface that intersects with a pipe axis of the first steel pipe,
the box front part has a box front shoulder surface being a distal end surface of the second steel pipe, and being a surface that intersects with the pipe axis, and
the pin rear shoulder surface and the box front shoulder surface are brought into contact with each other.

6. The steel pipe joint structure of claim 1, wherein
the pin front part has a pin front shoulder surface being a distal end surface of the first steel pipe, and intersecting with the pipe axis,
the box rear part has a box rear shoulder surface being a surface that intersects with a pipe axis of the second steel pipe, and
the pin front shoulder surface and the box rear shoulder surface are brought into contact with each other.

7. The steel pipe joint structure of claim 1, wherein the pin front part includes a non-external-thread part having no external thread.

8. The steel pipe joint structure of claim 1, wherein
the box rear part includes a non-internal-thread part having no internal thread.

9. The steel pipe joint structure of claim 1, wherein
each of the first steel pipe and the second steel pipe has a pin at one end portion, and has a box at an other end portion.

10. The steel pipe joint structure of claim 1, wherein
the first steel pipe has a pin at each end portion of the first steel pipe, and
the second steel pipe has a box at each end portion of the second steel pipe.

11. The steel pipe joint structure of claim 1, wherein
a stepped part is formed on an outer peripheral surface of the external thread part at a position closer than the pin front parallel thread part to the pin rear part.

12. The steel pipe joint structure of claim 1, wherein
the external thread part includes a tapered thread part connected to a pin rear part side of the pin front parallel thread part, and
in the cross section including the pipe axis, the tapered thread part includes a partial region connected to the pin front parallel thread part, and a root of the tapered thread part in the partial region has a larger width than a root of the pin complete thread part.

13. A steel pipe joint structure that connects a first steel pipe and a second steel pipe with each other, the first steel pipe having an external thread at least at one end portion of the first steel pipe, the second steel pipe having an internal thread at least at one end portion of the second steel pipe, comprising:
in the first steel pipe, a pin front part, an external thread part having the external thread, and a pin rear part arranged in this order from a distal end of the first steel pipe, and
in the second steel pipe, a box front part, an internal thread part having the internal thread, and a box rear part arranged in this order from a distal end of the second steel pipe, wherein
the external thread part includes
- a pin rear incomplete thread part at an end portion on a pin rear part side, the pin rear incomplete thread part being a tapered thread and an incomplete thread, and
- a pin complete thread part at a center portion of the external thread part, the pin complete thread part being a tapered thread and a complete thread, the internal thread part includes
- a box front parallel thread part at an end portion on a box front part side, the box front parallel thread part being a parallel thread and an incomplete thread, and
- a box complete thread part at a center portion of the internal thread part, the box complete thread part being a tapered thread and a complete thread, the pin rear incomplete thread part and the box front parallel thread part are threadedly engaged with each other by engagement in which a stabbing flank of the pin rear incomplete thread part and a stabbing flank of the box front parallel thread part are brought into contact with each other, and a load flank of the pin rear incomplete thread part and a load flank of the box front parallel thread part are brought into contact with each other, and
in cross section including a pipe axis, a root of the box front parallel thread part has a larger width than a root of the box complete thread part.

14. A steel pipe joint structure that connects a first steel pipe and a second steel pipe with each other, the first steel pipe having an external thread at least at one end portion of the first steel pipe, the second steel pipe having an internal thread at least at one end portion of the second steel pipe, comprising:
in the first steel pipe, a pin front part, an external thread part having the external thread, and a pin rear part arranged in this order from a distal end of the first steel pipe, and
in the second steel pipe, a box front part, an internal thread part having the internal thread, and a box rear part arranged in this order from a distal end of the second steel pipe, wherein
the external thread part includes
- a pin front parallel thread part at an end portion on a pin front part side, the pin front parallel thread part being a parallel thread and an incomplete thread, and
- a pin complete thread part at a center portion of the external thread part, the pin complete thread part being a tapered thread and a complete thread, the internal thread part includes
- a box rear incomplete thread part at an end portion on a box rear part side, the box rear incomplete thread part being a tapered thread and an incomplete thread, and
- a box complete thread part at a center portion of the internal thread part, the box complete thread part being a tapered thread and a complete thread, the pin front parallel thread part and the box rear incomplete thread part are threadedly engaged with each other by engagement in which a stabbing flank of the pin front parallel thread part and a stabbing flank of the box rear incomplete thread part are brought into contact with each other, and a load flank of the pin front parallel thread part and a load flank of the box rear incomplete thread part are brought into contact with each other, and a root of the box rear incomplete thread part has a larger width than a root of the box complete thread part.

15. The steel pipe joint structure of claim 14, wherein the external thread part further includes a pin rear incomplete thread part at an end portion on a pin rear part side, the pin rear incomplete thread part being a tapered thread and an incomplete thread, the internal thread part further includes a box-side parallel thread part at an end portion on a box front part side, the box-side parallel thread part being a parallel thread and an incomplete thread, the pin rear incomplete thread part and the box-side parallel thread part are threadedly engaged with each other, and a root of the pin rear incomplete thread part has a larger width than a root of the pin complete thread part.

16. A steel pipe joint structure that connects a first steel pipe and a second steel pipe with each other, the first steel pipe having an external thread at least at one end portion of the first steel pipe, the second steel pipe having an internal thread at least at one end portion of the second steel pipe, comprising:

in the first steel pipe, a pin front part, an external thread part having the external thread, and a pin rear part arranged in this order from a distal end of the first steel pipe, and in the second steel pipe, a box front part, an internal thread part having the internal thread, and a box rear part arranged in this order from a distal end of the second steel pipe, wherein the external thread part includes a pin rear incomplete thread part at an end portion on a pin rear part side, the pin rear incomplete thread part being a parallel thread and an incomplete thread, and a pin complete thread part at a center portion of the external thread part, the pin complete thread part being a tapered thread and a complete thread, the internal thread part includes a box-side parallel thread part at an end portion on a box front part side, the box-side parallel thread part being a parallel thread and an incomplete thread, and a box complete thread part at a center portion of the internal thread part, the box complete thread part being a tapered thread and a complete thread, the pin rear incomplete thread part and the box-side parallel thread part are threadedly engaged with each other by engagement in which a stabbing flank of the pin rear incomplete thread part and a stabbing flank of the box-side parallel thread part are brought into contact with each other, and a load flank of the pin rear incomplete thread part and a load flank of the box-side parallel thread part are brought into contact with each other, and a root of the pin rear incomplete thread part has a larger width than a root of the pin complete thread part.

17. A method for processing a steel pipe, an external thread part or an internal thread part being processed at an end portion of the steel pipe by the method, wherein the external thread part or the internal thread part includes a parallel thread part and a tapered thread part in this order from a distal end of the steel pipe, the method comprising:

making a plurality of normal processing passes in which a thread cutting insert is fed from an initial position at a first feeding speed, thus continuously processing the parallel thread part and the tapered thread part, making a first size reduction processing pass in which a stabbing flank of the parallel thread part is processed at a second feeding speed, making a second size reduction processing pass in which the stabbing flank of the parallel thread part is processed at the second feeding speed, and a stabbing flank of the tapered thread part is processed at the first feeding speed, and making a third size reduction processing pass in which a load flank of the parallel thread part is processed at a third feeding speed, and processing is performed on the tapered thread part at the first feeding speed, wherein in the first size reduction processing pass and the second size reduction processing pass, processing is started from a position closer to the steel pipe than the initial position, and in the third size reduction processing pass, the processing is started from a position farther from the steel pipe than the initial position.

18. A method for processing a steel pipe, an external thread part or an internal thread part being processed at an end portion of the steel pipe by the method, wherein the external thread part or the internal thread part includes a parallel thread part and a tapered thread part in this order from a distal end of the steel pipe, the method comprising:

making a plurality of normal processing passes in which a thread cutting insert is fed from an initial position at a first feeding speed, thus continuously processing the parallel thread part and the tapered thread part, making a first size reduction processing pass in which a stabbing flank of the parallel thread part and a stabbing flank of a portion of the tapered thread part are processed at a second feeding speed, making a second size reduction processing pass in which the stabbing flank of the parallel thread part and the stabbing flank of the portion of the tapered thread part are processed at the second feeding speed, and a stabbing flank of portions of the tapered thread part other than the portion is processed at the first feeding speed, and making a third size reduction processing pass in which a load flank of the parallel thread part and a load flank of the portion of the tapered thread part are processed at a third feeding speed, and processing is performed on the portions of the tapered thread part other than the portion at the first feeding speed, wherein in the first size reduction processing pass and the second size reduction processing pass, processing is started from a position closer to the steel pipe than the initial position, and in the third size reduction processing pass, the processing is started from a position farther from the steel pipe than the initial position.

* * * * *